US008886249B2

(12) United States Patent
Richardson

(10) Patent No.: US 8,886,249 B2
(45) Date of Patent: *Nov. 11, 2014

(54) METHOD AND SYSTEM OF SETTING TRANSMITTER POWER LEVELS

(71) Applicant: Airvana LP, Chelmsford, MA (US)

(72) Inventor: Andrew Richardson, Newmarket (GB)

(73) Assignee: Airvana LP, Chelmsford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,648

(22) Filed: Nov. 9, 2012

(65) Prior Publication Data

US 2013/0165107 A1   Jun. 27, 2013

Related U.S. Application Data

(60) Continuation of application No. 13/074,813, filed on Mar. 29, 2011, now Pat. No. 8,311,570, which is a division of application No. 11/572,977, filed on Jan. 30, 2007, now Pat. No. 8,290,527.

(30) Foreign Application Priority Data

| Jul. 30, 2004 | (GB) | 0417025.4 |
| Jul. 30, 2004 | (GB) | 0417051.0 |
| Jul. 30, 2004 | (GB) | 0417052.8 |
| May 5, 2005 | (GB) | 0509243.2 |
| Aug. 1, 2005 | (WO) | PCT/GB2005/003034 |

(51) Int. Cl.
*H04B 7/00* (2006.01)

(52) U.S. Cl.
USPC ........... 455/522; 455/67.11; 455/69; 370/318

(58) Field of Classification Search
USPC ............... 455/522, 67.11, 68–70, 115.3, 126, 455/127.1, 135, 226.3, 277.2, 525; 370/338, 445, 245, 908, 318
See application file for complete search history.

(56) References Cited

U.S. PATENT DOCUMENTS

| 5,111,535 A | 5/1992 | Tokunaga |
| 5,239,572 A | 8/1993 | Saegusa et al. |

(Continued)

FOREIGN PATENT DOCUMENTS

| EP | 0483547 | 5/1992 |
| EP | 0631397 | 12/1994 |

(Continued)

OTHER PUBLICATIONS

International Search Report and Written Opinion mailed Jan. 10, 2006 in corresponding PCT application No. PCT/GB2005/003028, Publication No. WO 2006/010957 (12 pages).

(Continued)

*Primary Examiner* — Dominic E Rego
(74) *Attorney, Agent, or Firm* — Fish & Richardson P.C.

(57) ABSTRACT

The invention relates to a method and system of setting transmitter power levels, particularly in a Local Network Node transmitter, providing a pico cell for private use. A User Equipment (UE) is used to make measurements of the transmission link properties, such as downlink power and round trip time. Based on the measurements made at one or a plurality of locations, the power of the Local Network Node can be determined such that interference is minimized with any overlying cells of a macro-network. Call handovers between the UE and the cell of a macro network can also be arranged based on properties measure by the UE.

21 Claims, 15 Drawing Sheets

(56) References Cited

U.S. PATENT DOCUMENTS

| | | |
|---|---|---|
| 5,499,395 A | 3/1996 | Doi et al. |
| 5,602,843 A | 2/1997 | Gray |
| 5,796,729 A | 8/1998 | Greaney et al. |
| 6,038,450 A | 3/2000 | Brink et al. |
| 6,041,236 A | 3/2000 | Bernardin et al. |
| 6,317,435 B1 | 11/2001 | Tiedemann et al. |
| 6,339,697 B1 | 1/2002 | Ranta |
| 6,438,379 B1 | 8/2002 | Gitlin et al. |
| 6,445,917 B1 | 9/2002 | Bark et al. |
| 6,496,700 B1 | 12/2002 | Chawla et al. |
| 6,643,813 B1 | 11/2003 | Johansson et al. |
| 6,650,872 B1 | 11/2003 | Karlsson |
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 7,009,944 B1 | 3/2006 | Hulbert |
| 7,076,252 B1 | 7/2006 | Hirvonen |
| 7,170,871 B2 | 1/2007 | Eyuboglu et al. |
| 7,193,978 B2 | 3/2007 | Ishikawa et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,373,161 B2 | 5/2008 | Anderson |
| 7,558,356 B2 | 7/2009 | Pollman et al. |
| 7,558,588 B2 | 7/2009 | To et al. |
| 7,603,127 B2 | 10/2009 | Chung et al. |
| 7,860,513 B2 | 12/2010 | Chung et al. |
| 7,907,571 B2 | 3/2011 | Raghothaman et al. |
| 7,995,493 B2 | 8/2011 | Anderlind et al. |
| 8,160,631 B2 | 4/2012 | Raghothaman et al. |
| 8,170,598 B2 | 5/2012 | Raghothaman et al. |
| 8,229,397 B2 | 7/2012 | Hou et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,385,291 B2 | 2/2013 | Richardson et al. |
| 8,503,342 B2 | 8/2013 | Richardson |
| 8,542,707 B2 | 9/2013 | Hou et al. |
| 8,693,987 B2 | 4/2014 | Chiussi et al. |
| 8,718,697 B2 | 5/2014 | Srinivas et al. |
| 2001/0004597 A1 | 6/2001 | Hirahara |
| 2001/0023189 A1 | 9/2001 | Kajimura |
| 2001/0046859 A1 | 11/2001 | Kil |
| 2002/0009998 A1 | 1/2002 | Reemtsma |
| 2002/0028691 A1 | 3/2002 | Moulsley et al. |
| 2002/0045451 A1 | 4/2002 | Hwang et al. |
| 2002/0075825 A1 | 6/2002 | Hills et al. |
| 2002/0110104 A1 | 8/2002 | Surdila et al. |
| 2002/0119798 A1 | 8/2002 | Hamabe |
| 2002/0131387 A1 | 9/2002 | Pitcher et al. |
| 2002/0137522 A1 | 9/2002 | Landais et al. |
| 2002/0142788 A1 | 10/2002 | Chawla et al. |
| 2002/0160790 A1 | 10/2002 | Schwartz |
| 2002/0187789 A1 | 12/2002 | Diachina et al. |
| 2002/0196749 A1 | 12/2002 | Eyuboglu et al. |
| 2003/0033394 A1 | 2/2003 | Stine |
| 2003/0096618 A1* | 5/2003 | Palenius ............... 455/453 |
| 2003/0100311 A1 | 5/2003 | Chung et al. |
| 2003/0117964 A1* | 6/2003 | Chen et al. ............... 370/252 |
| 2003/0134656 A1 | 7/2003 | Chang et al. |
| 2004/0131029 A1* | 7/2004 | Tobe et al. ............... 370/331 |
| 2004/0136336 A1 | 7/2004 | Nakamura et al. |
| 2004/0166887 A1 | 8/2004 | Laroia et al. |
| 2004/0203725 A1 | 10/2004 | Lahav et al. |
| 2004/0259560 A1 | 12/2004 | Hosein et al. |
| 2005/0025098 A1 | 2/2005 | Terabe |
| 2005/0136961 A1 | 6/2005 | Simonsson et al. |
| 2005/0157673 A1 | 7/2005 | Verma et al. |
| 2005/0213555 A1 | 9/2005 | Eyuboglu et al. |
| 2005/0243749 A1 | 11/2005 | Mehrabanzad et al. |
| 2005/0245279 A1 | 11/2005 | Mehrabanzad et al. |
| 2006/0009177 A1 | 1/2006 | Persico et al. |
| 2006/0067422 A1 | 3/2006 | Chung |
| 2006/0067451 A1 | 3/2006 | Pollman et al. |
| 2006/0077924 A1 | 4/2006 | Rune |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ch'ng et al. |
| 2009/0172397 A1 | 7/2009 | Kim |
| 2009/0186626 A1 | 7/2009 | Raghothaman |
| 2009/0262697 A1 | 10/2009 | To et al. |
| 2010/0085910 A1 | 4/2010 | Humblet |
| 2010/0157941 A1 | 6/2010 | Raghothaman et al. |
| 2010/0165957 A1 | 7/2010 | Hegde et al. |
| 2010/0165960 A1 | 7/2010 | Richardson |
| 2010/0167718 A1 | 7/2010 | Chiussi et al. |
| 2010/0167777 A1 | 7/2010 | Raghothaman et al. |
| 2010/0242103 A1 | 9/2010 | Richardson et al. |
| 2011/0317574 A1 | 12/2011 | Richardson |
| 2014/0003389 A1 | 5/2013 | Yu Wang et al. |

(56) References Cited

U.S. PATENT DOCUMENTS

| | | | |
|---|---|---|---|
| 2013/0165107 A1 | 6/2013 | Richardson | |
| 2013/0171996 A1 | 7/2013 | Richardson et al. | |

FOREIGN PATENT DOCUMENTS

| | | |
|---|---|---|
| EP | 0766427 | 4/1997 |
| EP | 0817516 | 1/1998 |
| EP | 0987868 | 3/2000 |
| EP | 1411670 | 12/2005 |
| EP | 1782551 | 5/2007 |
| EP | 1779543 | 4/2012 |
| GB | 2304495 | 3/1997 |
| GB | 2336069 | 10/1999 |
| GB | 2360909 | 10/2001 |
| GB | 2366689 | 3/2002 |
| GB | 2372909 | 9/2002 |
| GB | 2390953 | 1/2004 |
| GB | 2408430 | 5/2005 |
| JP | 08140135 | 5/1996 |
| JP | 110175425 | 7/1999 |
| WO | WO 95/26094 | 9/1995 |
| WO | WO 98/09455 | 3/1998 |
| WO | WO 99/43109 | 8/1999 |
| WO | WO 00/18014 | 3/2000 |
| WO | WO 00/28752 | 5/2000 |
| WO | WO 01/52427 | 7/2001 |
| WO | WO 01/56147 | 8/2001 |
| WO | WO 02/07341 | 1/2002 |
| WO | WO 02/07380 | 1/2002 |
| WO | WO 02/07471 | 1/2002 |
| WO | WO 02/07472 | 1/2002 |
| WO | WO 02/37798 | 5/2002 |
| WO | WO 02/37882 | 5/2002 |
| WO | WO 02/49275 | 6/2002 |
| WO | WO 02/085056 | 10/2002 |
| WO | WO 02/087192 | 10/2002 |
| WO | WO 03/025768 | 3/2003 |
| WO | WO 03/041277 | 5/2003 |
| WO | WO 03/044949 | 5/2003 |
| WO | WO 03/044961 | 5/2003 |
| WO | WO 03/049299 | 6/2003 |
| WO | WO 03/084084 | 10/2003 |
| WO | WO 03/103162 | 12/2003 |
| WO | WO 2004/019596 | 3/2004 |
| WO | WO 2004/032548 | 4/2004 |
| WO | WO 2004/042934 | 5/2004 |
| WO | WO 2004/042990 | 5/2004 |
| WO | WO 2004/054124 | 6/2004 |
| WO | WO 2004/059959 | 7/2004 |
| WO | WO 2004/063937 | 7/2004 |
| WO | WO 2004/077693 | 9/2004 |
| WO | WO 2004/080018 | 9/2004 |
| WO | WO 2004/082149 | 9/2004 |
| WO | WO 2006/010953 | 2/2009 |
| WO | WO 2006/010957 | 2/2009 |
| WO | WO 2006/010958 | 2/2009 |

OTHER PUBLICATIONS

International Search Report and Written Opinion mailed Jul. 26, 2006 in corresponding PCT application No. PCT/GB2005/003034, Publication No. WO 2006/010958 (17 pages).
International Search Report and Written Opinion mailed Feb. 24, 2006 in corresponding PCT application No. PCT/GB2005/003007, Publication No. WO 2006/010953 (15 pages).
Universal Mobile Telecommunications System (UMTS); Provision of Services in UMTS—The Virtual Home Environment (Highlighting release 99 requirement), TS 22.21 V1.10.0, Jan. 1999, 22 pages.
3rd Generation Partnership Project; Technical Specification Group Radio Access Network; Physical layer-Measurements (FDD) (Release 4), 3GPP TS 25.215 V4.6.0 (2002-12), 18 pages.
3rd Generation Partnership Project; Technical Specification Group Core Network and Terminals; Signalling Flows For The IP Multimedia Call Control Based on Session Initiation Protocol (SIP) and Session Description Protocol (SDP); Stage 3 (Release 5), 3GPP TS 24.228 V5.15.0 (Sep., 2006), 851 pages.
3rd Generation Partnership Project; Technical Specification Group Core Network and Terminals; Handover Procedures (Release 7), 3GPP TS 23.009 V7.0.0 (2007-3), 287 pages.
3rd Generation Partnership Project; Technical Specification Group Services and Systems Aspects; Network Architecture (Release 8), 3GPP TS 23.002 V8.0.0 (Jun., 2007), 62 pages.
3rd Generation Partnership Project; Technical Specification Group Core Network and Terminals; IP Multimedia Call Control Protocol Based on Session Initiation Protocol (SIP) and Session Description Protocol (SDP); Stage 3 (Release 8), 3GPP TS 24.229 V8.0.0 (200706), 438 pages.
3rd Generation Partnership Project; Technical Specification Group Radio Access Network; Utran Iu interface RANAP Signalling (Release 7), 3GPP TS 25.413 V7.6.0 (2007-06), 359 pages.
3rd Generation Partnership Project; Technical Specification Group Core Network and Terminals; Mobile Application Part (MAP) Specification; (Release 8), 3GPP TS 29.002 V8.2.0 (2007-06), 911 pages.
Gupta (IEEE 802.21 Media Independent Handover Service, Draft Technical Requirements, 21-04-0087-00-0000, Jul. 12, 2004).
Plasse (SIP for Call Control in the 3G IP-Based Umts Core Network, Interworking 2000, LNCS 1938, pp. 32-38, 2000).
Lin et al. (One-Pass GPRS and IMS Authentication Procedure for UMTS, Jan. 23, 2004).
EP Examination Report for Application No. 05767920.1, mailed Jun. 10, 2008, 6 pages.
Response to EP Examination Report for Application No. 05767920.1, mailed Jun. 10, 2008, filed Dec. 18, 2008, 2 pages.
International Preliminary Report on Patentability from PCT application No. PCT/GB2005/003028 mailed Jan. 11, 2006, 8 pages.
EP Examination Report for Application No. 05767588.6, mailed Apr. 19, 2011, 5 pages.
Response to EP Examination Report for Application No. 05767588.6, mailed Apr. 19, 2011, filed Aug. 22, 2011, 9 pages.
Hamabe K. et al., "Distributed Dynamic Channel Allocation for the Evolution of Tdma Cellular Systems" IEICE Transactions on Communications, Institute of Electronics Information and Comm. Eng. Tokyo, JP, vol. E79-B, No. 3, Mar. 1, 1996, pp. 230-236, XP000588444, ISSN: 0916-8516, paragraphs 03.3, 04.1.
Furukawa H et al., "A microcell overlaid with umbrella cell system" Vehicular Technology Conference, 1994 IEEE 44th Stockholm, Sweden 8-10 Jun. 1994, New York, NY, USA, IEEE, Jun. 8, 1994, pp. 1455-1459, XP010123320 ISBN: 0-7803-1927-3 (p. 1456, left-hand column, line 1—p. 1457, left-hand column, line 5; figure 4).
Armbruester H., "Dritte Generation Der MobilKommunikation" Telecom Report, De, Siemens Ag. Munchen, vol. 15, No. 2, Mar. 1, 1992, pp. 60-63, XP000274586, ISSN: 0344-4724.
U.S. Examiner Jing Gao, Uspto Office Action in U.S. Appl. No. 11/572,973, mailed Jan. 6, 2010, 12 pages.
Fish and Richardson, P.C., Response to Uspto Office Action for U.S. Appl. No. 11/572,973, filed Apr. 6, 2010, 12 pages.
U.S. Examiner Jing Gao, Uspto Final Office Action in U.S. Appl. No. 11/572,973, mailed Jul. 8, 2010, 11 pages.
Fish and Richardson, P.C., Response to Uspto Final Office Action for U.S. Appl. No. 11/572,973, filed Nov. 5, 2010, 13 pages.
U.S. Examiner Dominic E. Rego, Uspto Office Action in U.S. Appl. No. 11/572,977, mailed May 12, 2010, 36 pages.
Fish and Richardson, P.C., Response to Uspto Office Action for U.S. Appl. No. 11/572,977, filed Nov. 10, 2010, 40 pages.
U.S. Examiner Dominic E. Rego, Uspto Final Office Action in U.S. Appl. No. 11/572,977, mailed Apr. 22, 2011, 26 pages.
Office Action from European Application No. 05 767 588.6—1237 by Examiner Pedro Borges dated Apr. 19, 2011 (5 pages).
International Preliminary Report on Patentability issued Jan. 30, 2007 in PCT application No. PCT/GB2005/003034, Publication No. WO 2006/010958 (10 pages).
U.S. Examiner Jing Gao, Uspto Final Office Action in U.S. Appl. No. 11/572,973, mailed May 10, 2012, 15 pages.

* cited by examiner

METHOD AND SYSTEM OF SETTING TRANSMITTER POWER LEVELS

CLAIM OF PRIORITY

This patent application is a continuation of, and claims priority to, U.S. patent application Ser. No. 13/074,813, which was filed on Mar. 29, 2011, which is a divisional of, and claims priority to, U.S. patent application Ser. No. 11/572, 977, which was filed on Jan. 30, 2007. The contents of U.S. patent application Ser. Nos. 13/074,813 and 11/572,977 are hereby incorporated by reference into this patent application as if set forth herein in full. This patent application also claims priority to PCT Application No. PCT/GB2005/003034 filed on Aug. 1, 2005, to Great Britain Application No. GB0417051.0 filed on Jul. 30, 2004, to Great Britain Application No. GB0417025.4 filed Jul. 30, 2004, to Great Britain Application No. GB0417052.8 filed Jul. 30, 2004, and to Great Britain Application No. GB0509243.2 filed May 5, 2005. The contents of PCT Application No. PCT/GB2005/003034, Great Britain Application No. GB0417051.0, Great Britain Application No. GB0417025.4, Great Britain Application No. GB0417052.8, and Great Britain Application No. GB0509243.2 are hereby incorporated by reference into this patent application as if set forth herein in full.

The invention relates to a communication system and in particular a method and system for adjusting the transmitter power levels within that communication system.

This invention relates to a 3G cellular communication system and in particular the Frequency Division Duplex or Time Division Duplex (FDD/TDD) mode of the Wideband Code Division Multiple Access (WCDMA) system defined by the Third Generation measurement processor Partnership Project (3GPP). This is described in more detail at www.3gpp.org.

The 3G cellular communication system provides subscribers with the ability to transmit text, digitised voice, video and other multi-media data from their mobile handset. The system is presently implemented by the Universal Mobile Telecommunications System (UMTS) which builds on the existing Global System for Mobile Communications (GSM) network and General Packet Radio Service (GPRS) technology. The initial specification for UMTS were referred to as 'Release 99', (R99) and define the standard network architecture for UMTS systems. More recently 'Release 5' (R5) has been developed, expanding the Release 99 functionality to include The IP Multimedia Subsystem (IMS). This provides an all Internet Protocol based wireless network, in comparison to the separate voice, data, signalling, and control network elements of Release 99 systems. Release 99 and Release 5 architecture will now be described in more detail by way of background and with reference to FIG. 1.

The circuit switched (CS) domain 2 of the Release 99 architecture is illustrated in the lower part of FIG. 1. User Equipment (UE) 4 will normally connect to the Node B 6, the Node B to the Radio Network Controller (RNC) 8 and the RNC to a Mobile Switching Centre (MSC) 10 in this case the MSC_B. The MSC allows interconnection to other networks and to the Public Switched Telephone Network (PSTN) 12. The MSC_B has access to the home location register (HLR) 14 and to the Authentication Centre (AuC) via the HLR.

The upper half of FIG. 1 illustrates the Release 5 IMS network architecture 20. In addition to the Node B 22 and the RNC 24, there is the Packet Switched PS domain Serving GPRS Support Node and Gateway GPRS Support Node (SGSN/GGSN) 26 and the IMS specific components such as Proxy-Call Session Control Function (P-CSCF) 28, Serving-Call Session Control Function (S-CSCF) 30, the Home Subscriber Server (HSS) 32, the Media Gateway Control Function (MGCF) 34 and the media gateway (MGW) 34 which connects to the PSTN 36.

The media sessions are established from the UE 4 via the PS domain and the P-CSCF and the S-CSCF. If the media session is via an external network such as the PSTN or another Public Land Mobile Network (PLMN) then the MGCF and the MGW are also required. The structure and operation of the IMS within the R5 network architecture are well known by those skilled in the art and are defined in the 3GPP specifications TS23.002, TS24.228 and TS24.229.

In addition to the above described elements, FIG. 1 illustrates a Local Network Node (LNN) 40, developed by the applicants, which provides supplemental controlled access to the Release 99 and Release 5 network architectures bypassing Node B's 6 and 22. The LNN is described in more detail in the applicant's co-pending patent application entitled "Local Network Node".

As mentioned above, the UE 4 normally connects to the network via Node B typically co-located with a Base Transceiver Station of the underlying GSM system. The LNN however provides a local user-controlled access point for the network, that may be installed in the home or office. By means of the LNN, a user can regulate local subscribers' access to the network.

Essentially, the LNN is a composite of elements of a Node B, an RNC, MSC, SGSN, GGSN and P-CSCF. In order to accommodate the LNN in the Release 99 architecture, the SIP/MSC_A element 16 is provided, logically connected to MSC_B 10, HLR/AuC 14 and PSTN 12. The SIP/MSC_A is configured to convert the Session Initiation Protocol commands from the UE 4, which are used to establish a session on an IP network, and to the ISND User part (ISUP/SS7) messages used to manage calls over a PSTN, and vice versa.

Thus, where a LNN is installed, the UE will connect to the Release 99 network via the LNN and SIP/MSC_A element 16, and to the Release 5 architecture via the LNN and S-CSCF 30.

At the interface to the R99 network, the UE will look like an SIP client that establishes circuit switched connections to the SIP enabled MSC, using the SIP signalling protocol. The SIP messages are used to transport the circuit switched signalling messages to the MSC, which then looks like an MSC as far as the remainder of the external network is concerned.

At the interface between the LNN 40 and the S-CSCF 30, the LNN looks like a UE communicating with the S-CSCF through a P-CSCF. Preferably, the messages from the LNN to the S-CSCF conform with the interface defined within the 3gpp specifications. The decision as to which network architecture the LNN will connect to is an operator decision. It may be the R99 circuit switched architecture, or it may be the R5 IMS architecture.

As mentioned earlier the LNN is intended for local installation in the home or office for example. In general, the coverage area of the LNN cell, hereafter referred to as a pica-cell, will overlap with the overlaying network cell hereafter referred to as a macro-cell. In addition, it is likely that the pico-cell will operate on the same frequency as the macro-cell for reasons of frequency economy.

The deployment of the pica-cells will occur in an un-coordinated and ad-hoc fashion as LNNs are installed to meet user requirements. The power levels of the pico-cells will need to be high enough for satisfactory connection with the local UEs. In this arrangement, the downlink transmissions from the pico-cell will interfere with the downlink transmissions from the macro-cell, and the interference is likely to result in degradation in the coverage of the macro-cell. We have therefore appreciated that it is desirable to regulate the power of the signals transmitted by the LNN.

SUMMARY OF INVENTION

The invention is defined in the independent claims to which reference should now be made. Advantageous features are set forth in the appendent claims.

BRIEF DESCRIPTION OF THE DRAWINGS

Preferred embodiments of the invention will now be described in more detail, by way of example, and with reference to the drawings in which.

DETAILED DESCRIPTION OF THE PREFERRED EMBODIMENT

Figure 2:
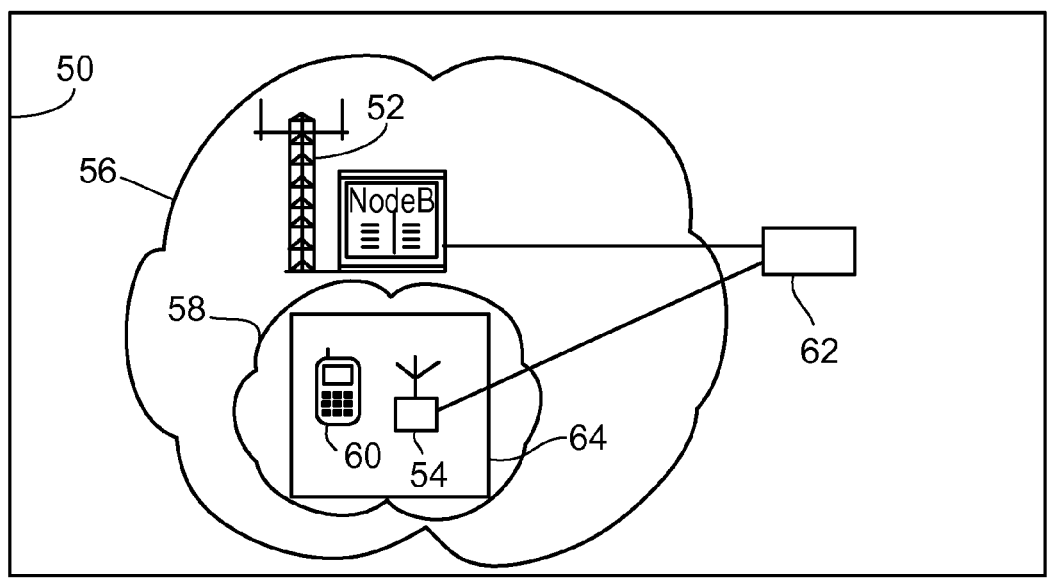
FIG. 2 illustrates the deployment of the LNN and its coincident coverage within a macro-cell.

The operation of a preferred embodiment of the invention will now be described in more detail. FIG. 2, illustrates the typical deployment of a Public Land Mobile Network (PLMN) 50, including a Node B 52 and a LNN 54. Although only a single Node B is illustrated, multiple additional Node B's will be present in the PLMN and controlled by one or more RNCs (not shown).

The Node B has a cell coverage represented by area 56, while the LNN has coverage represented by area 58.

The diagram shows the overlapping coverage between the macro-cell 56 of the Node B and the pico-cell 58 of the LNN. The User Equipment 60 is located primarily within the pico-cell for connection with the LNN. Both the Node B and the LNN are connected to the rest of the PLMN network 62.

The term user equipment will be understood to include any device with 3G capabilities, including mobile terminals such as mobile phones, and personal digital assistants, laptops, or other palm-held or hand-held computing devices, as well as typically non-mobile devices such as desktop computers.

The term mobile network will also be understood to refer to any telecommunication network architecture or service provider making a range of telecommunication services available to such user equipment.

Additionally, FIG. 2 shows a notional required boundary 64 for the desired coverage area for the LNN. This boundary may represent the area of a dwelling, or the area occupied by some commercial enterprise for example.

The coverage of the pico-cell 58 will be defined by a number of factors such as the transmit power for the LNN 54. However, the degree of interference from the LNN to the macro-cell will be related to the LNN transmit power. We have therefore appreciated that it is desirable to regulate the transmit power so that sufficient coverage for the pico-cell is provided but so that interference of the pico-cell with the macro-cell is minimized.

Thus the LNN provides a private coverage cell, which can be used by subscribers to the LNN. UEs on the overlying public network provided by mobile phone providers preferably will not have access to the LNN pico-cell unless they subscribe.

Figure 3:
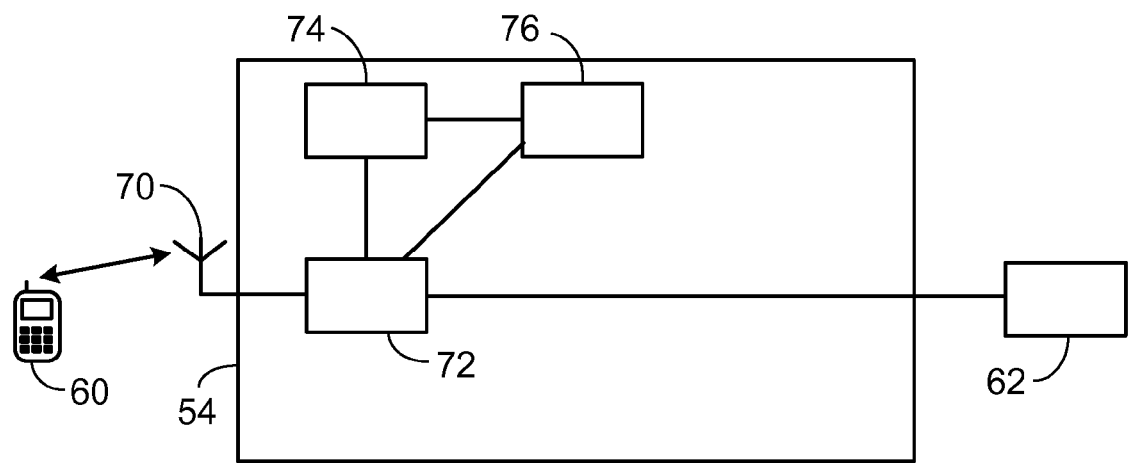
FIG. 3 is a schematic illustration of the local network node according to a preferred embodiment of the invention.

The LNN according to the preferred embodiment of the invention is shown in FIG. 3 to which reference should now be made.

Figure 1:
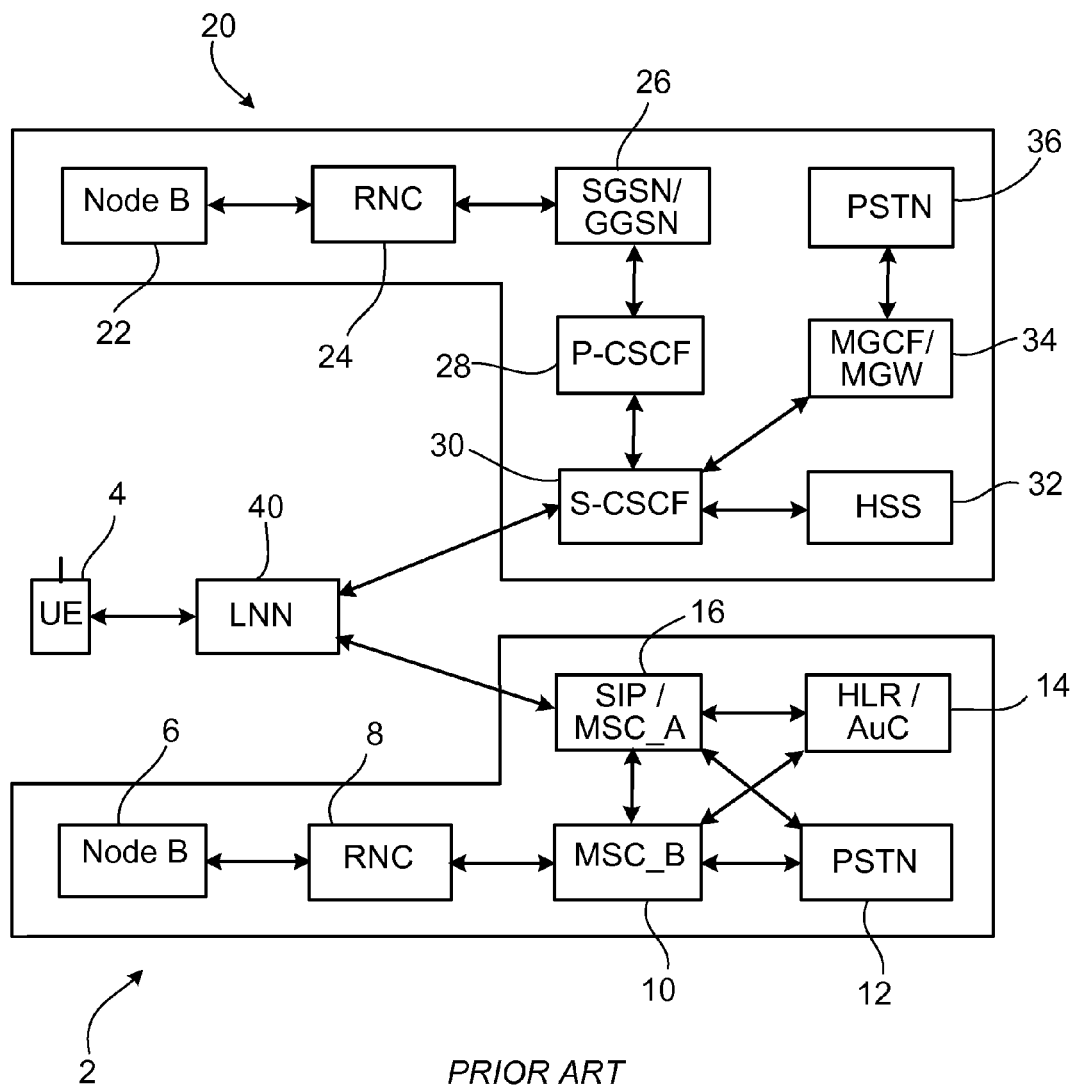
FIG. 1 is an illustration of a UMTS network architecture comprising a LNN.

The LNN 54 comprises antenna 70, for receiving and transmitting signals to UE 4. The received radio signals are passed to 3G processor 72, hereinafter referred to as the processor or processing function, which is connected to demultiplex/decode the received radio signals into 3G commands or data. When the LNN is transmitting, the processor 72 may be operated to convert the 3G commands and data into respective radio signals for transmission to the UE. The processor also performs the 3G processing functions appropriate to the LNN and described earlier, such as communicating with the SIP/MSC_A, or the S-CSCF shown in FIG. 1. These functions will not be considered in detail here.

Additionally, processor 72 is arranged to communicate with measurement processor or measurement processing function 74, which in turn communicates with controller or control function 76. Commands are issued from the controller 76, to the processor 72 in order to effect a change in the operation of the LNN.

For example, the controller may request a particular kind of connection between the UE and the LNN be established, and request that the UE monitor and measure the characteristics of the connection. These commands will be communicated to the UE by the processing block 72, in order to configure the UE.

Control of the UE in this way, and the measurements that can be made of the connection are provided for by the functionality of the Radio Resource Control (RRC) protocol layer of the UMTS system, and are defined in detail in the standards document TS 25.331 published by 3GPP. Such measurements may include the downlink received signal code power, the downlink Ec/Io (where Ec is the energy per chip, Io is an estimate of interference, or the measured interference), the downlink path loss, the UE transmit power uplink and downlink signal quality estimates, round trip time (RTT) estimates and position estimates, for example. Only the LNN will make a measurement of the RTT, but both the LNN and the UE are able to make measurements of the signal level.

The processor 72 is therefore also configured to receive signals from the UE containing the obtained measurement information, extract that information, and pass it to measurement processor 74. The retrieval of the measurement information from the UE is based on a standard procedure defined in TS25.331 and so shall not be described in detail here.

The measurement function is arranged to perform a range of functions, such as filtering and averaging to smooth variations, maximum and minimum detection, or the calculation of variables based on input data. In doing so, the measurement function derives a measurement result, which is passed to controller 76 so that specific action can be taken.

Preferred methods and systems for controlling the LNN to regulate the power will now be described in more detail.

First Manner of Operation

The preferred system carefully controls the power settings of the LNN downlink common channels and hence limits the interference from the LNN to the macro-cell. There are two aspects to the first manner of operating the preferred embodiment. In the first aspect the downlink power from the LNN to the UE is set based on measurements made by the LNN and the UE, and subsequently adjusted according to measurements of variations caused by ageing effects and possible changes to the propagation environment.

In a second aspect of the invention, the RTT estimates can be used by the LNN to estimate the approximate distance that the UE is from the LNN. In doing so it is possible to ensure that the ranges being established by the user are within defined limits. The maximum RTT and hence the distance in which the user is permitted to be from the LNN could be either predefined and stored within the LNN, related to the service that the user subscribes to, or signalled to the LNN by the network based on other operator specific conditions.

Additionally, the distance of the user from the LNN can be used when defining the coverage area. The distance information can be used as a gating function that can be applied to the power setting measurements.

The maximum power level for the LNN can then be configured in such a way as to optimise the coverage from the LNN within an area designated by the user, but in a manner that reduces the interference to any over-lying macro networks. The maximum power can also be continuously adjusted to ensure that the interference levels to the over-lying macro network are kept to a minimum.

Figure 4:
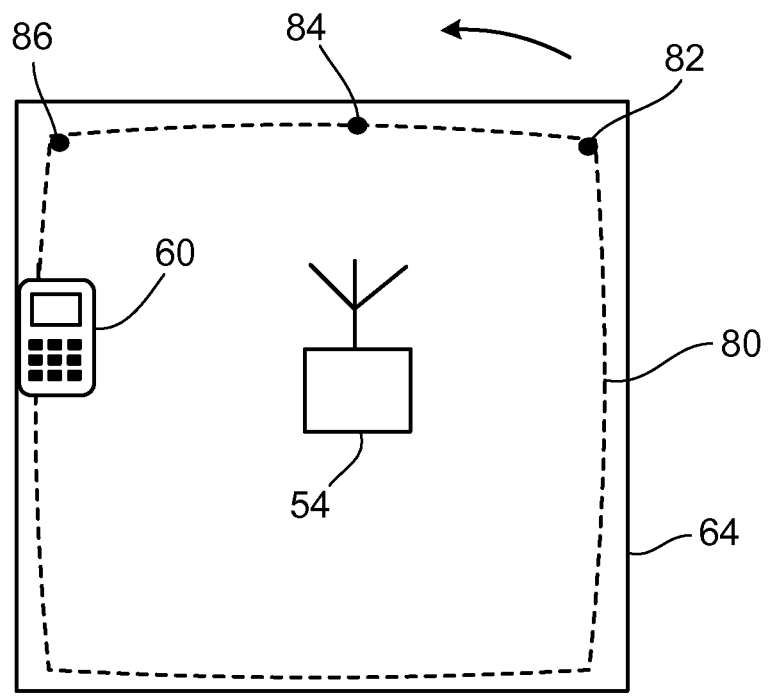
FIG. 4 is a schematic illustration of the technique for configuring the transmit power of the downlink according to a first control method.

We will start by considering the operation of the first aspect. FIG. 4 illustrates the required coverage area 64, the LNN 54 located within the coverage area, the UE 60 used to perform the measurements, and a path that the user traverses 80 around the coverage area, a first point on the path 82, a subsequent point on the path 84 and an additional point on the path 86. It will be appreciated that the required coverage area is likely to correspond to the area occupied by a building such as an office, or a user's home. The path 80 is therefore likely to correspond approximately to the perimeter of the building, or grounds.

The operation of the LNN will further be described with reference to the flowchart of FIG. 5. In order to set the LNN transmit power to an appropriate level, the LNN user first moves to a start point 82. The user then activate the power setting procedure through a dedicated mechanism, such as the dialling of an initiation code (short code) on the UE that is recognised by the processor 72 within the LNN 54. This is illustrated in Step S10.

The dialled short code is received by the LNN processor 72, and identified causing the establishment of a connection between the UE 60 and the LNN 54. The short code triggers the processing block 72 to notify the controller 76 that the connection is being activated in step S12. In Step S14 the controller 76 requests that the processor configures the connection such that it is a full duplex connection, has a constant data rate and a constant transmit power for both the UE and the LNN. This ensures that the conditions of the link between the handset UE and the LNN remain the same while the measurements are occurring. As a result, all that will be changing is the propagation loss from the environment. It is possible to compensate if one or more of the three conditions specified above is absent, though the measurement becomes correspondingly complex.

In addition the controller 76 requests that the processor 72 configure the UE to measure selected parameters of the downlink signal, and the processor 72 in the LNN to measure the uplink parameters from the UE 60. The measurements can be made by the Radio Frequency (RF) stages within the 3G processor of the LNN, or alternately in designated Digital Signal Processors or Application Specific Integrated Circuits. Those measurements which involve the amplitude and phase of the received signal can be made after the signal has been digitised, either in a Digital Signal Processor (DSP) or an Application Specific Integrated Circuit (ASIC). The measurements that can be configured and the methods and periodicity of the measurement reports are all known in the art and are defined in TS25.331 as mentioned above. Preferably, the types of measurements that are requested from the UE include the downlink received signal code power, the downlink Ec/Io measurement (where Ec is the energy per chip, Io is the estimated or measured interference), the downlink path loss and the UE transmit power, and the parameters measured by the LNN 54 include the uplink received signal code power and the RTT.

With the call active, the user traverses the route 80 along the perimeter of the area to be covered in the direction of the arrow in step S16. The UE continues to measure the characteristics of the downlink and reports them to the LNN according to the known protocol defined in TS25.331.

The measurement data from the UE 60 arrives at the processor 72 and is passed to the measurement processor 74, along with the measurements made within the LNN 54 by the processor 72.

When the user has traversed the required path the measurement can be halted, for instance through the pressing of the call end button in step S18. This signals to the processor 72 in the LNN 54 that the measurement cycle is completed, and in step S20, the processor 74 notifies the controller 76 that the measurement process is complete. The controller also notifies the measurement processor 74 that the measurement is complete.

The next stage is to process the measured results to arrive at a value for the maximum transmit power that is to be used for the common channels.

All or one of the measured values may be used depending on the rigour with which the calculation of optimum power is to be made. The values to be used may therefore be configurable, with the presently selected configuration being stored in the controller 76.

Figure 6:
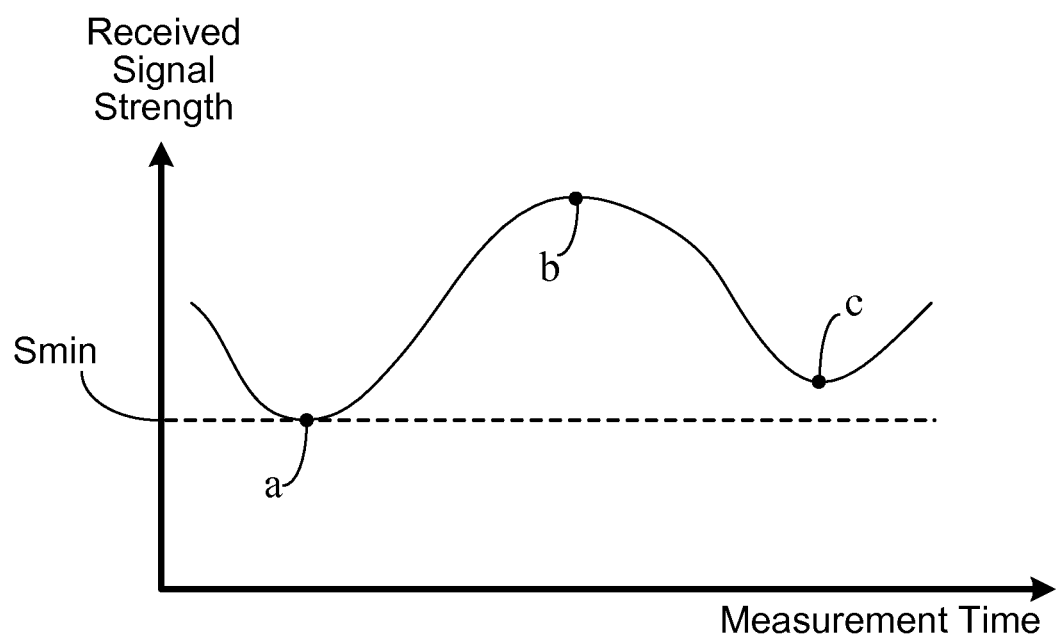
FIG. 6 is a schematic illustration of the measured received signal strength obtained by the user equipment in the first control method.

If, for example, the downlink received signal code power (RSCP) from the LNN to the UE is measured, a curve for the RSCP, such as the one illustrated in FIG. 6, may be obtained. FIG. 6 illustrates the variation in the received signal power with time as the user moves around the boundary of the desired coverage domain. The higher the value the larger the received signal power.

Also shown are three points on the curve. The first point a corresponds to the measurement taken at point 82 of the path in FIG. 4, the second point b corresponds to measurement taken at point 84, and the third point c corresponds to the measurement taken at point 86.

From FIG. 6, we can see that the lowest signal level $S_{min}$ was found to occur at point a, representing one of the extreme positions within the coverage area. The minimum signal level is represented by the line shown on FIG. 6. The measurement processor function 74 identifies the low point a, and its magnitude $S_{min}$ in step S22, and transmits this measurement to the controller 76. Subsequently in step S24, based on an algorithm in the controller 76, the measurement is converted by the controller into a maximum desired transmit power for the common channels used by the LNN.

The simplest algorithm is to scale the transmit power by an amount that is equal to the difference between the minimum measured signal power $S_{min}$ and the required signal power for the pilot channel. To illustrate this, let us consider an example, assuming that the pilot power transmitted by the LNN during the measurement stage was set to 1 mW (0 dBm) and the received minimum signal code power $S_{min}$ at the UE was measured as −90 dBm. Assuming that the required power for the correct reception of the pilot channel is −100 dBm, then the transmit power for the pilot channel can be reduced by 10 dBm to −10 dBm or 0.1 mW and correct reception will still be possible. In this way, the transmit power of the LNN can be reduced to limit its interference with overlapping macro-cells.

The data channel power can be set with respect to the pilot channel, and could be greater or smaller depending on the implementation.

An alternative and more sophisticated algorithm that could be employed in step S24 is to estimate the transmit power using an algorithm such as:

$$PTX = k*RSCP$$

Where PTX is the required transmit power being estimated, RSCP is the average received signal code power and k is a factor which is to be derived. Preferably, k is based on a link budget analysis of the transmission path from the LNN to the UE, that is an analysis of the known gains and losses in the transmission path from the transmitter to the receiver. It also should take into account the LNN transmit power used during the measurement procedure, and the fading margins required to give acceptable outage probability, based on the number of measurements and the statistical variation of the measurements. The outage probability may thought of as the likelihood that a signal will not be received with sufficient signal strength for it to be decoded and understood at a receiver in the coverage area. The fading margin on the other hand is the additional signal power required at the transmitter for the signal to be received in the coverage area with a given probability.

It will be appreciated for example that it is impossible to predict the likely power that a receiver at any particular location would receive at any given time. However, by measuring the received power, say, in a number of locations over time statistics can be built up and the mean received signal power can be calculated. The statistics conform to a known distribution such as the Rayleigh distribution, and so given the mean value it is possible to estimate how much additional signal is required to achieve some required coverage probability, such as 90%.

The simplest method for estimating these fading margins is to assume that the received signal power level at the UE when expressed in dB's corresponds to a Gaussian distribution. By using a curve fitting procedure, the mean and standard deviation for the measurement distributions can then be estimated by the measurement processor 74. The controller 76 will be pre-configured for a specific outage probability (for instance 10% outage), and from this the additional fade margin required can be derived from the Gaussian fit to the measured data. With the all of the data now known, k may be derived be comparing the actual transmit power, with the desired fading margin.

Once the initial transmit power level has been estimated by the use of either of the two techniques within the measurement processor 74, the controller instructs the processing block 72 to configure the powers for the downlink common channels in step S26. The relative powers needed for the different common channels based on the power of the measured pilot channel are known by those skilled in the art and can therefore be set accordingly.

With the initial power set, the controller is then arranged to initiate periodic measurements by the UE and the LNN. Using these periodic measurements, the controller can track the difference in the actual downlink common channel power and the required power, based on the measurements it receives from the measurement processor. If there is a change over time, then the controller can instruct the processor 72 to adjust its transmit power.

Preferably, a configurable margin is also added to ensure that the user has coverage even if they are at the limit of reception, such as at the edge of the coverage area when the signal drops slightly due to an interference event. A margin of between 3 db and 5 db has been found to be sufficient for this.

Preferably, in a second aspect of the operation to the invention, distance measurements are also used in the downlink power estimation algorithm. Using the distance measurements from the LNN, it is possible to provide additional control over the power level settings for the LNN. The application of, this second aspect of the invention applies to both the initial configuration of the power level and also to the subsequent power tracking algorithm. This would allow the administrator of the LNN to set maximum distances for the coverage area. Any power measurements made at distances greater than the maximum set distance, would not then be considered.

Preferably, the distance measurements are made using the Round Trip Time (RTT) estimation made in the LNN for the transmissions between the LNN and the UE, although other methods such as the use of GPS could also be used. The estimation of the RTT relies on the fact that the uplink and downlink timing in the 3G FDD mode defined by the 3GPP organisation are fixed. The deviations from this ideal uplink/downlink timing are therefore caused by the propagation delay for the signals as they travel from the LNN to the UE and then from the UE back to the LNN. As is known in the art, the deviations allow a value for RTT to be estimated.

Preferably therefore, maximum RTT levels are set, so that when the RTT exceeds these maximum limits the downlink transmit power measurement is suspended. This avoids the controller increasing the power to communicate with a UE that has strayed out of the defined area.

For example, consider the case where the UE 60 and the LNN 54 have been configured to make the initial measurements as defined in the first aspect of the control technique. If, in addition, the LNN measures the RTT, then processor 72 will forward these measurements to the measurement processor 74 in step S16.

Figure 7:
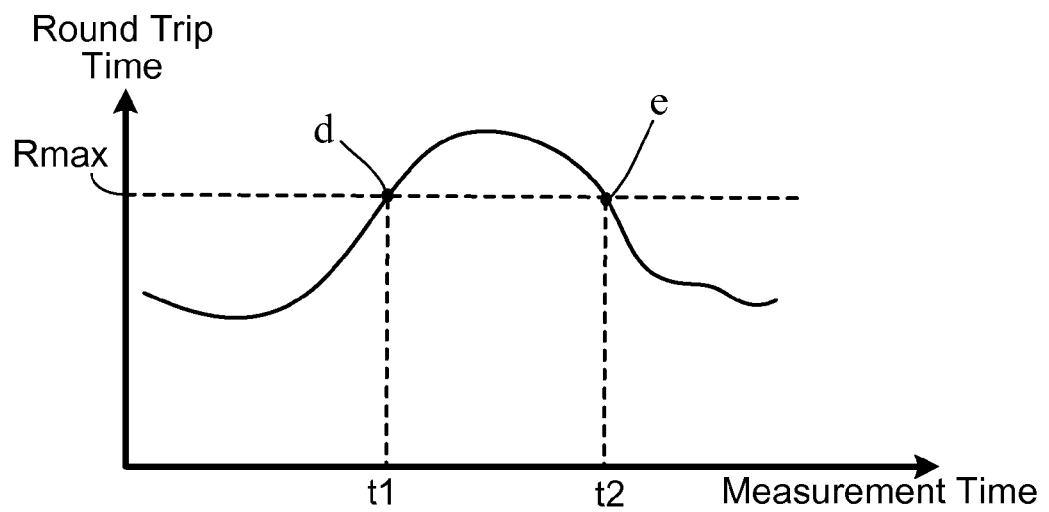
FIG. 7 is a schematic illustration of the measured round trip time obtained by the LNN in the first control method.

An example of the RTT measurement is illustrated in FIG. 7. FIG. 7 presents the estimated RTT versus the measurement time. The controller 76 has a maximum RTT threshold $R_{max}$. At time t1 (point d) the RTT measurement exceeds the maximum RTT threshold and only passes below this threshold at time t2 (point e).

Figure 8:
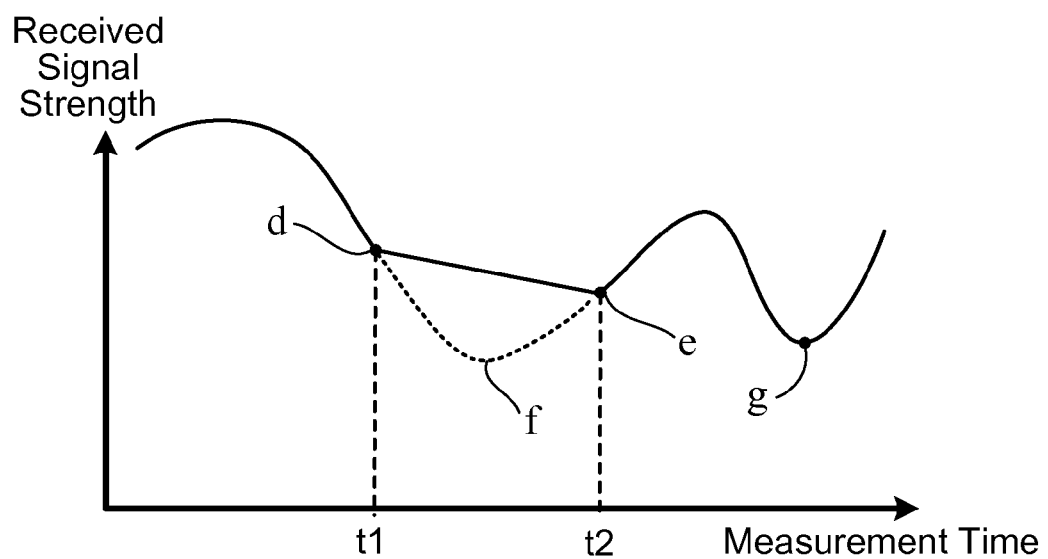
FIG. 8 is a schematic illustration of the measured received signal strength obtained by the user equipment in the first control method, when the round trip time measurement is taken into account.

The received signal strength is shown in FIG. 8 for the same period. At time t1 (point d) the signal is dropping, and the controller in response to detecting that the RTT has exceeded the threshold value instructs the processor 72 to suspend the measurements of the communication channel. At time t2 when the controller detects that the RTT has fallen below the threshold $R_{max}$, the measurements are resumed. Thus, the lowest signal point f, which occurred during this measurement suspension period, is consequently not recorded as the lowest measurement. Instead, the lowest measurement used for the purpose of the subsequent calculation is point g which occurred after the RTT fell below the maximum RTT threshold $R_{max}$.

Alternatively, the measurement recording may not be suspended between time instants t1 and t2, but rather in post processing by the measurement process function, the controller may instruct the use of the measurements over this period to be disregarded or interpolated.

Using this procedure, it is possible to ensure that the maximum signal level that will result for the downlink common channels will not be defined solely by measurement points that exceed certain distances from the LNN.

There are many additional reasons why it is advantageous to include distance measurements in the monitoring of channel power. One reason is to limit the extent of coverage of the LNN from an interference perspective and the second is to provide different tariffs to customers. The higher the tariff the greater the range that may be allowed, and the greater the associated RTT limit.

Although the first control method has been described incorporating a single user equipment for the making of measurement results, it would of course be possible to receive measurements from different user equipment devices positioned around the boundary of the domain.

Additionally, although in the above description the connection between the user equipment and the LNN is continuous, so that data may be obtained as the user moves around the boundary of the desired coverage area, it is possible to make it discontinuous, so that measurements may be obtained only from particular discrete points.

In both of these situations, the short code dialled on the UE may be modified so that instead of issuing a continuous connection that it is terminated only when the user presses the 'end call' button, a call is initiated for a predefined limited period of say 5 seconds. This would allow a user in place in a boundary location to activate the short code, wait for the connection to be established, and for the measurement results to be transmitted to the LNN, and then move onto the next location after the 5 seconds had elapsed. This technique could also be expanded so that the LNN can recognise short codes identifying different user equipment. In this way, where the coverage area is larger, the taking of measurements can be divided up between a number of different operators with separate user equipment.

Although in the above discussion, the downlink RSCP has been used as the measure of signal power, in an alternative approach it may be preferable to take an average of the downlink and the uplink received signal power, rather than just the downlink value.

Second Manner of Operation

The LNN according to the preferred embodiment of the invention also provides a second method and system for setting the transmitter powers within the LNN. These utilise the measurements that the UE may make of the adjacent cells in the network, and the measurements that the LNN makes of the UE. By combining these measurements, it is possible to estimate a transmit power level for the LNN that minimises interference with overlapping macro-cells. This allows LNN's to adjust their transmit power in a manner that ensures the interference from the LNNs to the macro-cellular network can be kept to a minimum given the ad-hoc nature for the deployment of the LNNs.

Figure 9:
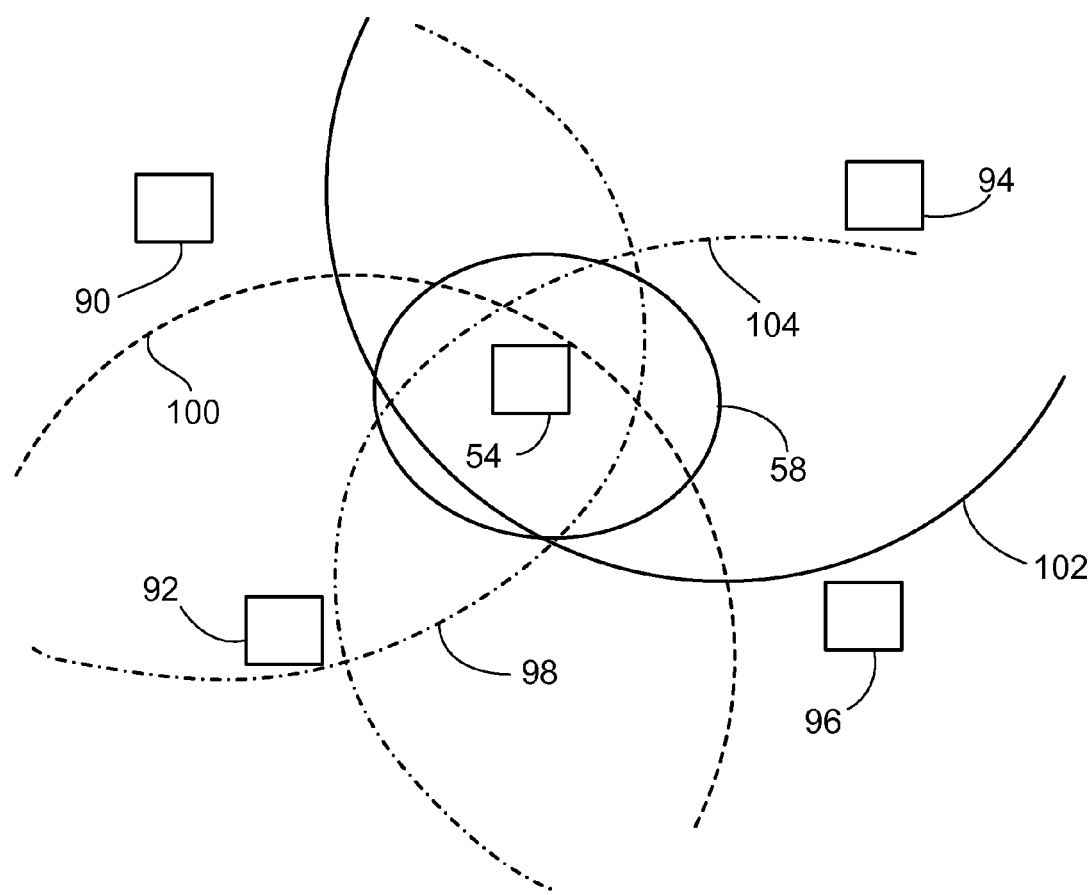
FIG. 9 is a schematic illustration of the coverage cell of the local network node, and overlapping cells from Node Bs in a mobile network.

We will start by considering as an example the deployment of an LNN within the macro-cellular environment shown in FIG. 9. The LNN 54 is deployed in an area in which there are a number of macro-cellular Node Bs 90, 92, 94 and 96.

The typical radius of coverage for the macro-cellular Node Bs is illustrated in the diagram. For Node B 90, the edge of the cell is illustrated by boundary 98; for Node B 92, the cell edge is shown as boundary 100; for Node B 94, the cell edge is shown by line 102; and for Node B 96, the cell edge is shown as line 104.

The LNN, therefore, lies within the coverage area of four cells, and on the downlink from the LNN to the UE (not shown), each of these four cells will contribute interference to the LNN cell shown by the cell edge 58.

To overcome this interference, the LNN transmit power could simply be set to its maximum value. However, if this were done, it would most likely result in excessive interference within the macro-cellular network and a drop in coverage within the macro-cell network.

The preferred solution, therefore is to set the LNN transmit power to the minimum value required to achieve the coverage area required for the LNN cell defined by the cell edge 58. To identify the minimum transmit power, the LNN is arranged to utilise measurements that are made by the UE and measurements that the LNN makes itself.

As mentioned earlier, the UE is able to make a number of measurements on the downlink of a WCDMA FDD mode system, as defined by the Third Generation Project Partnership (www.3gpp.org). In particular, the UE has the capability to carry out measurements on cells that are adjacent to the current serving cell. The cells that the UE may measure are referred to as intra-frequency cells if they are on the same frequency as the serving cell for the UE, inter-frequency cells if they are on a different frequency to the serving cell, and inter-RAT (Radio Access Technology) cells if they use a different technology to the serving cell technology.

Under normal operating conditions, the UE is instructed to measure other cells either through broadcast messages or control messages sent directly to the UE by the network. This is done so that a determination may be made about whether to perform a handover between two cells. These cells are referred to within the WCDMA standard as the monitoring set, and will be well known by one skilled in the art.

The monitoring set is defined in the broadcast channels sent to the UE in the downlink. In the preferred embodiment, the LNN is configured to only monitor the uplink channel from the UE. The LNN will not therefore be able to receive data defining the monitoring set, unless a UE is installed at the LNN itself. Although, this is possible, it would result in more expense and complexity.

Within the WCDMA standard, however, the UE is also configured to measure what is known as the 'detected' set. This is the set of cells that the UE has detected but which do not form part of the monitoring set. Preferably therefore, the UE is arranged to identify the detected set cells and report them to the network, which in this embodiment will be accessed via the LNN. The detected set is limited by the WCDMA standard to intra-frequency cells. Thus, inter-frequency and inter-RAT cells will not be considered.

Figure 10:
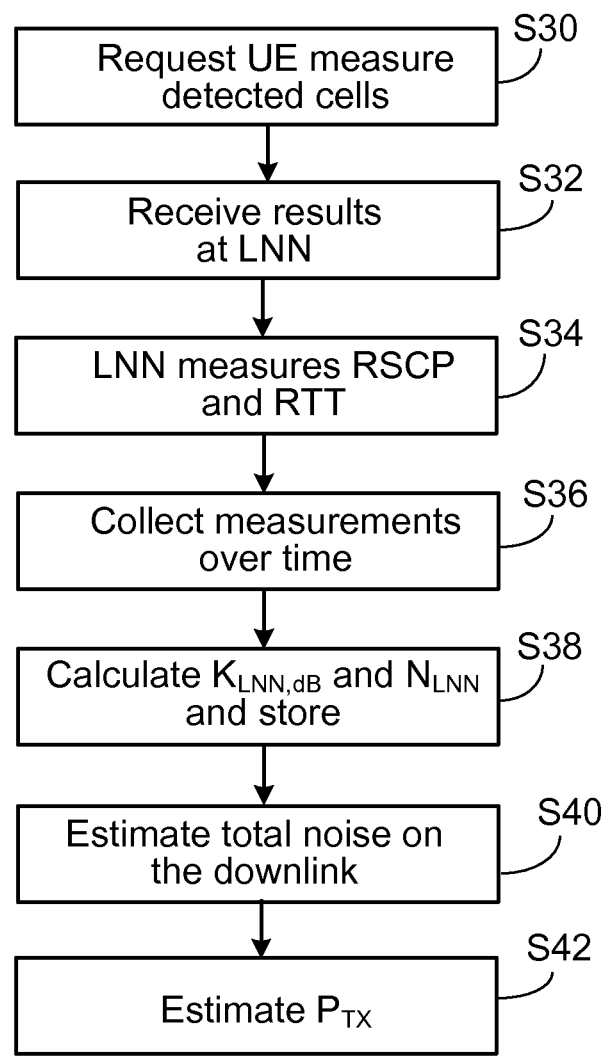
FIG. 10 is a flowchart illustrating the steps taken in the second control method of the local network node.

The operation of the LNN will now be described in more detail with reference to FIG. 10. In Step S30, the controller requests that the UE take a measurement of cells in the detected cell set. The request is transmitted to the UE by the processing function 72. When reporting on detected cells on the same frequency as the serving cell, the information that the UE can be configured to report to the LNN by the LNN is the path loss, Ec/Io (where Ec is the energy per chip, Io is the estimated ore measured interference), received signal code power (RSCP), the cell identity, the transmit and receive time offset at the UE and the cell scrambling code. In addition, the UE can measure and report its current transmitted power. In this embodiment it is assumed that the power control option for the UE will be such that the UE transmit power remains constant whilst the measurement is being made and reported. The reason for this, is to allow the LNN to measure the UE received power while the transmit power is kept constant. In alternative embodiments in which the power control may be active, the LNN will need to account for the transmitter power variation and the timing differences between when the measurements were made when the power control requests were received and when the power control requests were acted upon.

In Step S32 the measurements taken by the UE are received at the LNN for each of the detected macro-cells In step S34, the processing function 72 of the LNN carries out measurements on the connection with the UE as set out according to the WCDMA standard (TS25.331 defines the configuration of the measurements, while the details of the measurements are set out in TS25.215) In particular, the LNN is arranged to measure the received signal code power (RSCP) from the UE, and the round-trip-time (RTT) between the UE and the LNN. Preferably, the RTT is measured with as high an accuracy as practically possible, typically, in the order of one eighth of a chip. From this RTT and the UE measured transmit and receive time offset, the distance from the UE to the LNN can be estimated. With an eighth of a chip resolution, this will allow distances greater than around 5 m to be measured. In the presence of multipath, the first significant received multipath component for the time measurement is used, and the rest discarded. This is because we are interested in the signals that arrive via the shortest path, as those signals will correspond most closely to the direct distance between the UE and the LNN.

Figure 11:
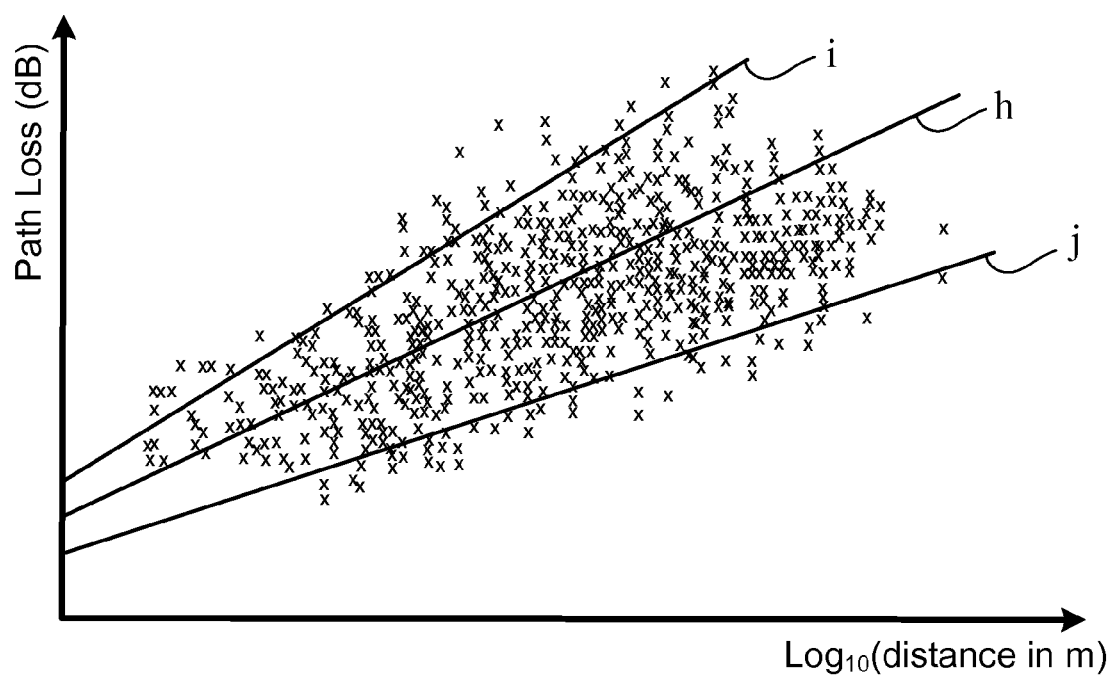
FIG. 11 is a graph showing Path Loss measurements against the log of the distance of the user equipment from the local network node.

From the UE measured transmit power, the LNN measured RSCP, and the LNN measured RTT a plot similar to the one shown in FIG. 11 could be created in step S36 by collecting the measurements over time and from different UEs. The plot in FIG. 11 is the measured path loss (PL) defined by:

$PL = UE$ measured transmit power$-LNN$ measured RSCP

Where the measured powers and path loss are given in dB.

In FIG. 11, the symbol "x" represents a computed point for the PL, as a function of the computed distance from the LNN. It will be appreciated that a number of points will be built up, as measurements are taken over time, and as measurements are received from different UEs within the coverage area. Thus a spread of points is received for any given distance, representing variations in the UEs being monitored, as well as environmental variations in the domain of the coverage area.

In step S38, the LNN estimates from FIG. 11, the average change in PL with distance, h, and also the upper standard deviation, i, and the lower standard deviation, j, from the estimated path loss.

In a wireless communication system the path loss, in general, can be estimated as a function of distance using the following general formula:

$$PL = \frac{P_{Tx}}{P_{Rx}} = \frac{k_{LNN}}{r^{N_{LNN}}} \quad (1)$$

where $K_{LNN}$ and $N_{LNN}$ are constants and r is the distance between the LNN and the UE. $P_{Tx}$ is the optimum transmitter power that is to be calculated and $P_{Rx}$ is the received wanted power at the UE. The constant $k_{LNN}$ includes the radiation power of the transmitting antenna, the received power from the antenna and therefore includes the antenna efficiency, the gain of the antenna, frequency considerations, and less well defined quantities such as the height of the antenna above ground. If desired, $k_{LNN}$ can be derived by one skilled in the art from theoretical factors, though it is preferred to measure it directly. $N_{LNN}$ is the path loss exponent, and is 2 for free space for example expressing the inverse square law. In a dense outdoor mobile environment, the exponent may be as high as 5, but it is more likely to be between 3 and 4.

In this embodiment, however, $k_{LNN}$ and $N_{LNN}$ may be derived from the plot presented in FIG. 11. If both sides of equation 1 are expressed in dBs, then we obtain:

$$PL_{dB} = k_{LNN\_dB} - 10N_{LNN}\text{Log}_{10}(r) \quad (2)$$

From FIG. 11 and the plot of the average PL (dB) versus 10*log 10(distance) 201, the constants $k_{LNN\text{-}dB}$ and $N_{LNN}$ can be found in step S38. This may be achieved using a least squares linear regression to solve Y=Ax+B for A and B, where Y=$PL_{dB}$, A=$-10N_{LNN}$, x=$\text{Log}_{10}(r)$, and B=$k_{LNN\_dB}$ When equation 2 is first used, there may not be sufficient measurement points recorded. Preferably therefore, a predefined set of values for the constants $k_{LNN\_dB}$ and $N_{LNN}$ is used. When measured points do become available, they can then be combined with the predefined values to produce a more accurate estimate based on the specific propagation environment.

Furthermore, the latest derived set of values for the constants are preferably stored in non-volatile memory in step S38. These stored values may subsequently be used as the predefined values in the event of power loss to the LNN, due perhaps to a move to a new location.

To estimate the optimum required transmit power for the LNN, the LNN next needs to estimate the total downlink interference from all of the overlapping macro Node Bs 90, 92, 94 and 96 in the detected set. Additionally, it is also necessary to estimate the downlink interference power from any other LNNs spread through the coverage area.

Preferably, the LNN makes a distinction in the way it handles the macro Node Bs and other LNNs in the area. It is likely for example, that the operator will want to keep the LNN transmit power to a sufficiently low level such that it degrades the performance of the macro-cells only by a low but defined level. For other LNNs, however, the operator may choose a slightly different criteria, as in general we will want some parity in the interference between the LNNs. As long as the power from the LNN is below operator defined limits for the macro-cells, any power level below that may simply be such that the LNN power is set to cover the required area. A control algorithm present in the processor 74, will be required to detect and correct for any race conditions that may result between two close LNNs.

From these considerations, the total noise plus interference (Io) on the downlink (for a single UE say) may be defined as:

$$I_O = \left[\sum_{i=1}^{m} a_i I_{oi} + \sum_{j=1}^{n} b_j I_{oj}\right] \quad (3)$$

Where: $I_{oi}$ is the UE measured RSCP from the $i^{th}$ macro-Node B, $a_i$ is a scaling factor for the ith macro-Node B and m is the number of detected interfering macro Node B's. The scaling factor $a_i$ could be a fixed quantity (e.g.=1), or it could be related to the distance that the Node B is from the LNN (estimated from the UE measured path loss estimate). Closer Node Bs could be allowed to have a greater contribution to the total interference estimation from the macro-cells. The scaling factors could therefore be applied by means of a look up table.

$I_{oj}$ is the UE measured RSCP from the jth LNN, $b_j$ is a scaling factor for the jth LNN and n is the number of detected interfering LNNs. The scaling factor $b_j$ can be used to either enhance or reduce the effects of the other LNNs on the interference estimation. Both a and b are intended to account for different path loss models that may occur in a real system. The value for these scale factors is preferably adjustable and will depend upon the specific propagation environment. The initial values could for example be based on the results of field trials, and programmed into the LNN at deployment.

In step S40, therefore the measurement processor uses equation 3 above, and the measurements taken previously in step S32 and S34 to determine an estimate for the noise interference on the downlink. With an estimate for the interference (Io), it is then possible to proceed to estimate the transmit power that is required for the LNN.

We will start with a basic CDMA equation known by one skilled in the art:

$$\frac{E_C}{I_O} = \frac{E_b}{N_O} \frac{1}{PG} \quad (4)$$

Where Ec is the energy per chip, Io is the interference estimated above, Eb is the required energy per information bit, No is the noise power spectral density and PG is the processing gain defined as:

$$PG = \frac{W}{R} \quad (5)$$

Where W is the chip rate bandwidth (3.84 MHz for FDD mode WCDMA) and R is the bandwidth of the information signal.

The received energy per chip Ec can also be defined in terms of the received signal power according to:

$$E_C = P_{Rx} T_C \quad (6)$$

Where $P_{Rx}$ is the received wanted power and $T_C$ is the chip duration. Substituting (1) into (6) gives:

$$E_c = \frac{P_{Tx} r^{N_{LNN}} T_C}{k_{LNN}} \quad (7)$$

Substituting (7) into (4) and solving for $P_{TX}$ and adding a margin $F_m$ gives:

$$P_{Tx} = \frac{E_b}{N_o} \frac{1}{PG} \frac{I_o}{T_c} \frac{k_{LNN}}{r^{N_{LNN}}} F_m \quad (8)$$

Finally, we can substitute Io for the values of RSCP that were measured by the UE and presented previously, so that (8) becomes:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m \quad (9)$$

In this equation, the values for $E_b$, $N_o$, PG, $I_{oi}$, $I_{oj}$ and $T_C$, are known and the values for $K_{LNN}$ and $N_{LNN}$ have been calculated in step S38 from the points in FIG. 11. $N_O$ is the noise power spectral density and is given by kT, where k is the Boltzman's constant and T is the receiver temperature in Kelvin. The scale factors $a_i$ and $b_j$ can either be fixed, derived from the path loss figures, or received from the network, as mentioned above.

The fade margin $F_m$ is added to the equation to account for the statistical variation in the received signal demonstrated in FIG. 11. The estimation of $F_m$ may therefore be based in part on field trials carried out by the operator of the LNN. However, $F_m$ may be considered as being of two parts:

$$F_m = F_{op} F_{meas} \quad (10)$$

$F_{op}$ is the margin that is defined by the operator based on the location of the LNN with respect to all other macro Node Bs. At the simplest level this could be estimated based on the path loss, the UE measured SFN-SFN (System Frame Number) offset and the received interference levels Io. The second quantity $F_{meas}$ may be based on the statistical measurements for the UE to LNN path loss versus distance shown in FIG. 11. If it is decided that a 90% probability of coverage is needed, then based on the estimated statistics of the received signal we can estimate what margin above or below the mean signal level is required.

Given all of the information available, all that is needed is the required radius of coverage r. The desired radius of coverage may for example be linked to a tariff structure. A low tariff could provide a 90% coverage probability say at ranges up to 10 m from the LNN, with a medium tariff extending this to 40 m and a high tariff extending this to 80 m.

The measurements that the LNN makes of the UE receive power plus the measurement of the UE transmit power made by the UE will be used later to calibrate the transmission path between the LNN and the UE.

Thus, the optimum Transmit power $P_{Tx}$ can be calculated by solving equation 9, containing terms which take into account the total estimated noise on the downlink due to other macro-cells, and the constants $k_{LNN}$ and $N_{LNN}$ which define characteristics of the environment. This gives the minimum transmit power required for the system to operate reliably in say 90% of the coverage area.

Third Manner of Operation

The third manner of operation of the preferred embodiment allows handovers between the LNN and the surrounding macro- or micro-cells to be intelligently managed from a user perspective.

The term handover is a generic term that implies that there is a change to the transmission path that a connection takes between the UE and the network. In general, the handover will result in a change to the connection in the UTRAN and may also have a change in the connection in the core network.

The handovers that impact the UTRAN are defined in TS25.331, while the examples of handovers that impact the core network are defined in 3GPP TS23.009. According to TS23.009 handovers that use different MSCs before and after the handover are referred to as inter-MSC handovers (inter-MSC SRNS relocations in 3G).

The type of handover that may occur within the UTRAN is identified by a number of terms. For a handset that is in the CELL_DCH state (a state that defines that the UE is allocated dedicated physical channels), the handovers are referred to as intra-frequency handover, inter-frequency handover and inter-radio access technology handover.

Intra-frequency handovers are known informally as soft-handovers and formally as an active set update. Inter-frequency handovers are known informally as hard-handovers and formally as a physical channel reconfiguration. The informal terminology will be used hereafter with the meaning as defined above.

As mentioned earlier, the extent of the usable radio coverage area from the LNN is referred to herein as the pico-cell, and surrounding the pico-cell will be radio coverage from the macro network either using the same frequency as the LNN or using a different frequency. The coverage from the macro network may be available via small cells or large cells, termed micro-cells and macro-cells respectively.

As a UE leaves the coverage area of the pico-cell, there is a possibility that the connection will go through a hard handover to the macro- or micro-cell. Unlike normal handovers, a handover from the LNN to an overlapping macro- or micro-cell may involve a change of service. It is likely for example that high data rate services such as video and high quality audio may not be available in the macro cell at the location of the UE, causing a drop in service as the handover occurs.

Additionally, within the pico-cell for a call initiated within the LNN, the tariff for the connection will in general be much less than in the macro-cell that surrounds the LNN. If the handover occurs and the connection is transferred from the pico-cell to the macro-cell, the user may incur an increase in the tariff due to a change to the macro-cell and the user may not be aware of this increase in tariff.

Thus, we have appreciated that data service and tariff reasons it is desirable to detect when a handover is about to occur and give a user of UE control over whether or not the handover takes place.

Figure 12:
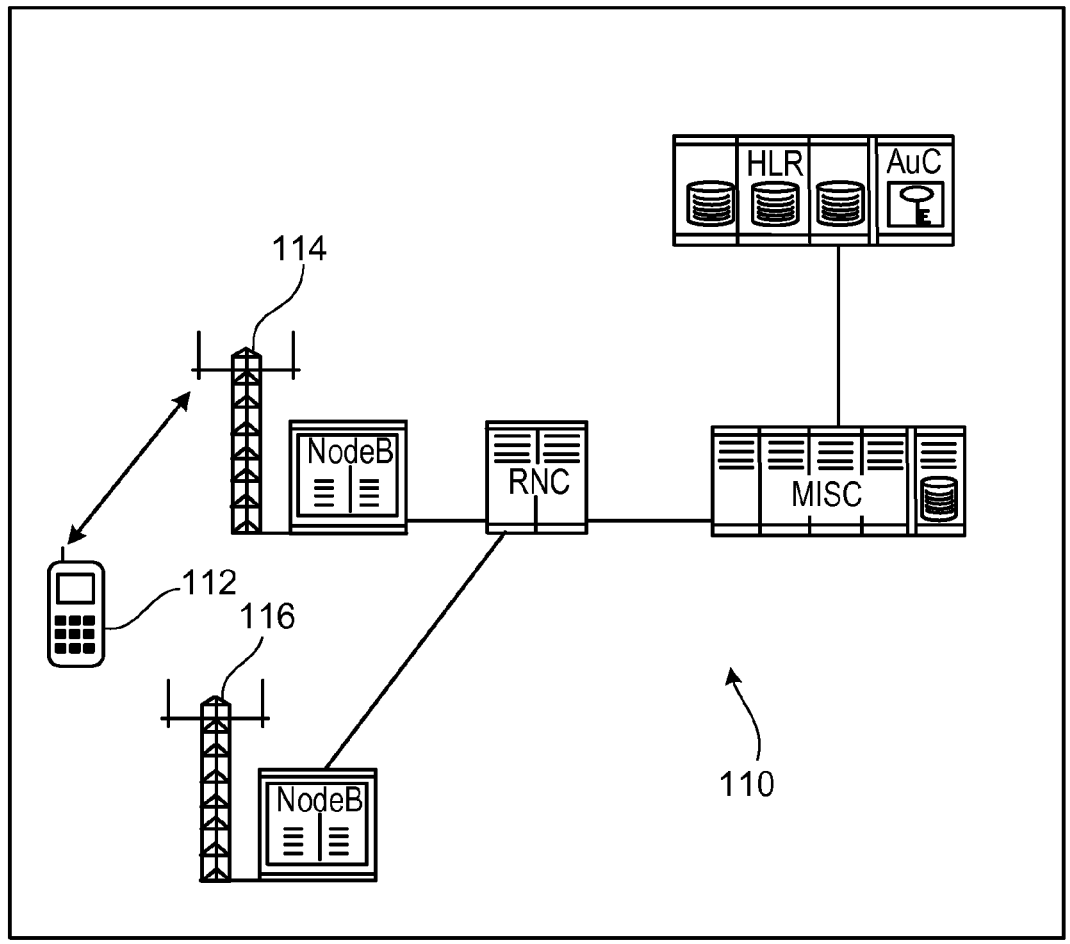
FIG. 12 is an illustration showing the typical arrangement of a network having no local network node.

In FIG. 12, we see that the typical deployment of a PLMN 110 network that does not include an LNN. The UEs 112 will pass through the network and move between the different Node B's 114, 116 through the use of handover procedures as outlined previously.

Referring again to FIG. 2, we see the deployment of an LNN 54 within a PLMN 50, including the overlapping coverage between the macro-cell 56 and the pico-cell 58. As the UE 60 moves away from the LNN the quality estimate for the connection will degrade.

Figure 13:
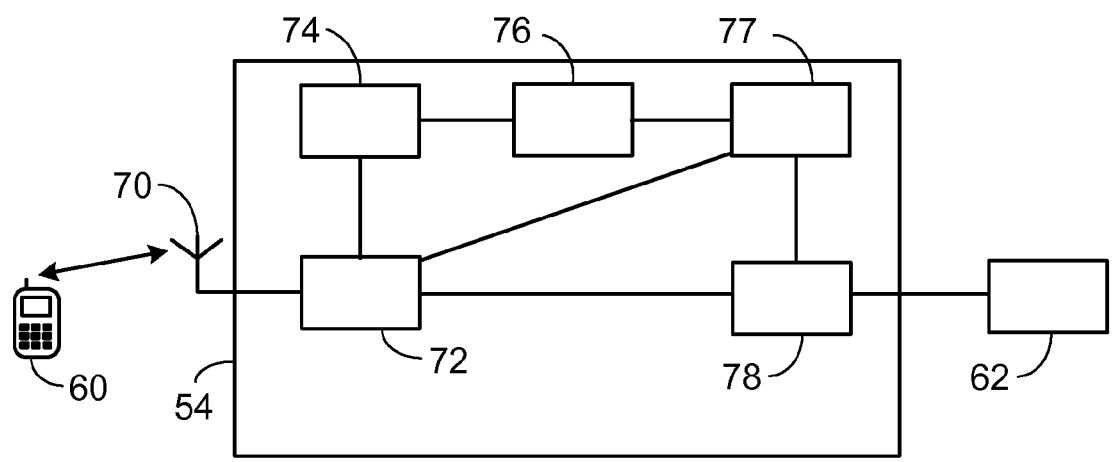
FIG. 13 is an illustration of a first alternative embodiment of the local network node for use with a third control method.
Figure 14:
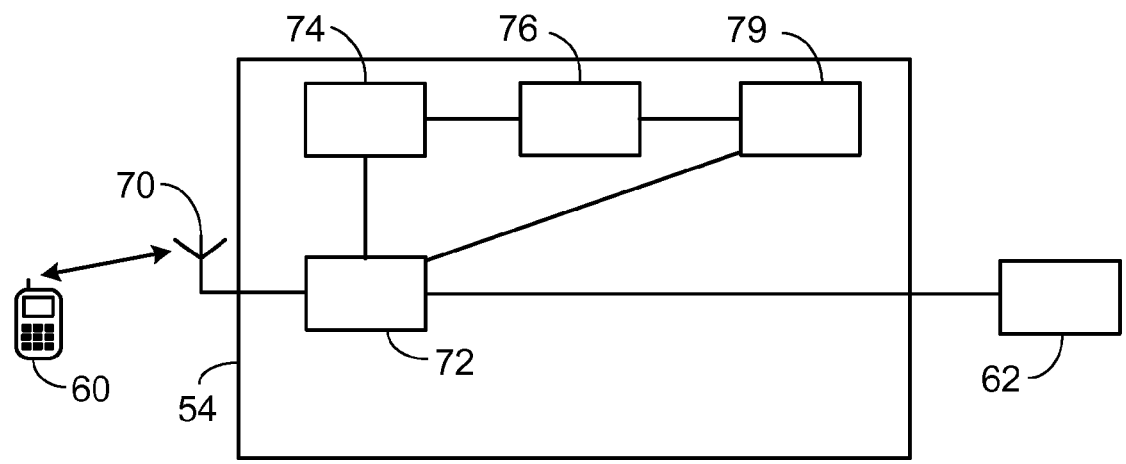
FIG. 14 is an illustration of a second alternative embodiment of the local network node for use with a third control method.
Figure 15:
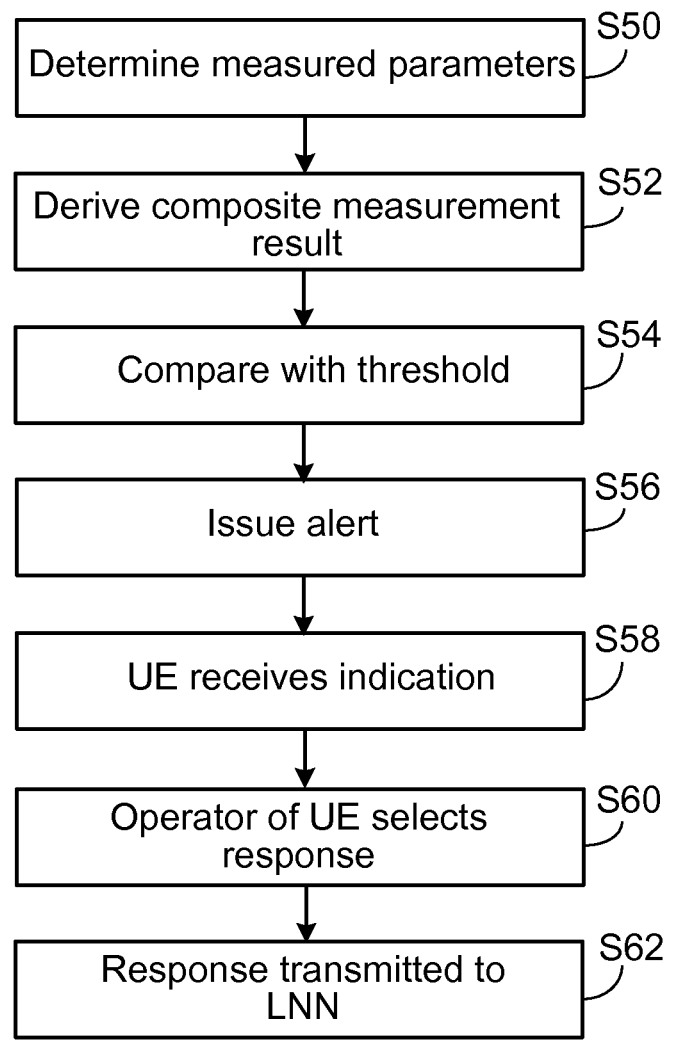
FIG. 15 is a flow chart illustrating the steps taken in the third control method of the local network node.

FIG. 13 and FIG. 14 present two example embodiments of the invention. The functional blocks are identical to those shown in FIG. 3, with DTMF tone generator 77 and codec 78 provided in the first embodiment, and an SMS message generator 79 provided in the second embodiment. The measurement and control blocks detect that a handover is about to occur by monitoring the measured attributes of the link in the manner described below.

In this mode of operation the measurement processor will also receive measurements from the processor 72. The measurements could be any or all from the selection of downlink transmit power levels for the dedicated channel, uplink signal level estimates measured in the LNN, downlink signal level estimates measured in the UE and signalled to the LNN, uplink signal quality estimates measured in the LNN, downlink signal quality estimates measured in the UE and signalled to the LNN, uplink path loss estimates measured in the LNN, downlink path loss estimates measured in the UE and signalled to the LNN, round-trip-time estimates measured in the LNN and position location estimates measured through procedures distributed between the UE and the LNN. The user can then be notified by means of the DTMF tone generator, or the SMS message generator.

Figure 5:
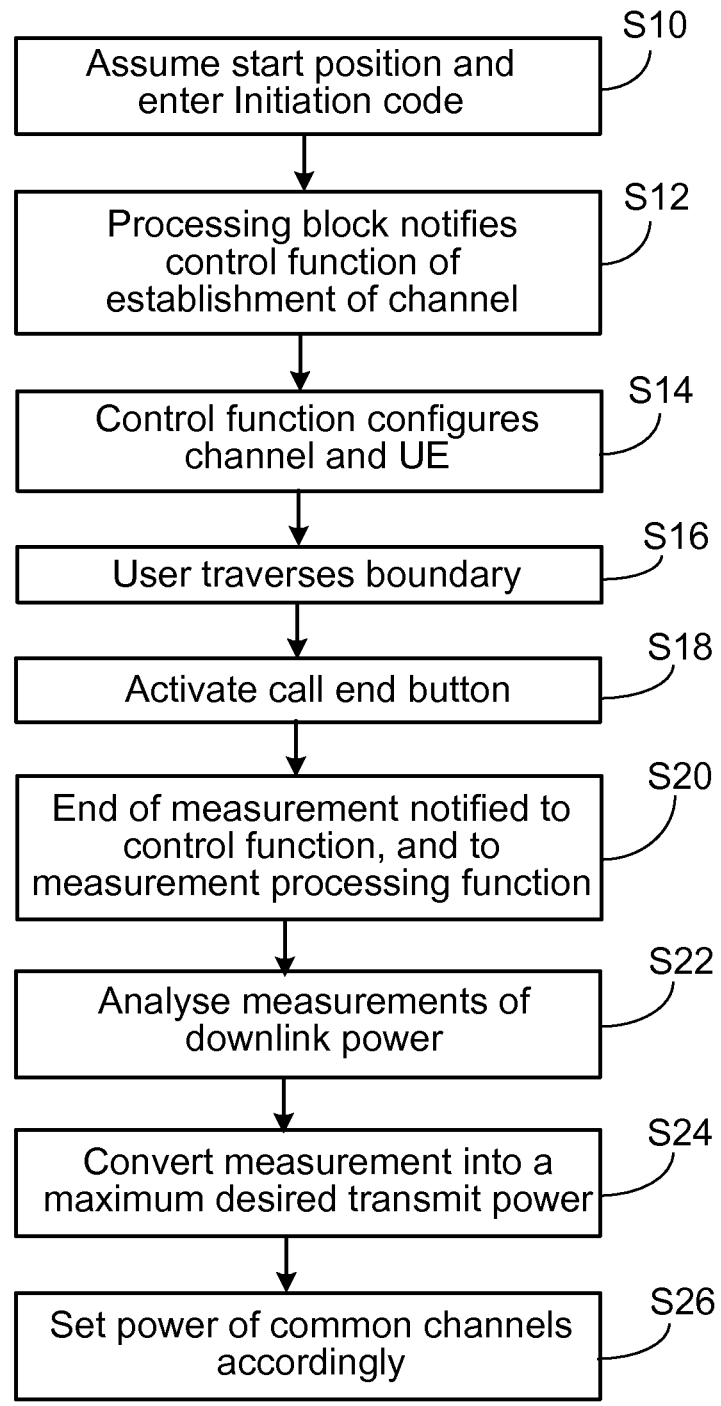
FIG. 5 is a flow chart illustrating the steps taken in the first control method.

Referring now to FIG. 5, the steps involved in managing the call handover process will now be described. Preferably, in step S50, the processing block is arranged to determine three different measurement quantities $(x_i, y_j, z_k)$ from the above list and pass these to the measurement processor for appropriate filtering and smoothing. Preferred properties are a composite quality estimate, such as a an average of the uplink and downlink quality, a composite of the path loss on the uplink and the downlink, and the Round Trip Time. Preferably, the composite path loss includes a transmit power and the required receive power so that the quantity defines how close to the minimum signal level the UE is. Then, in step S52 the measurement processor derives a composite measurement result (CMR) via an equation such as:

$$CMR_{i,j,k} = P\{f(x_i, x_{i-1}, \ldots, x_0), g(y_j, y_{j-1}, \ldots, y_0), h(z_k, z_{k-1}, \ldots, z_0)\}$$

Where $f(x_i, x_{i-1}, \ldots, x_0)$ is a linear, non-linear or logical function of the ith measured quantity of x and any previous measurements, $g(y_j, y^{j-1}, \ldots, y_0)$ is a linear, non-linear or logical function of the jth measured quantity of y and any previous measurements, and $h(z_k, z_{k-1}, \ldots, z_0)$ is a linear, non-linear or logical function of the kth measured quantity of z and any previous measurements. The function $P\{.\}$ is a linear, non-linear or logical function that combines the functions $f(\ )$, $g(\ )$ and $h(\ )$.

To consider a specific embodiment of this equation we can imagine that x=transmit power in dB, y is the round-trip-time in microseconds and z is the path loss in dB. From these quantities we could derive an equation such as:

$$CMR_{i,j,k} = (I^*x_i + m^*y_j + n^*z_k)/3$$

Where I, m and n are appropriate configurable scaling factors for the measurements being made. In this embodiment all of the functions $P\{\ \}$, $f(\ )$, $g(\ )$ and $h(\ )$ are simple linear functions.

The selection of what parameters to use is implementation specific in order to give a representation of the signal quality of the link. However the preferred variables are mentioned above. The measurement function 86 then passes the derived measurement quantity $CMR_{i,j,k}$ to the controller 76 in step S52.

Figure 16:
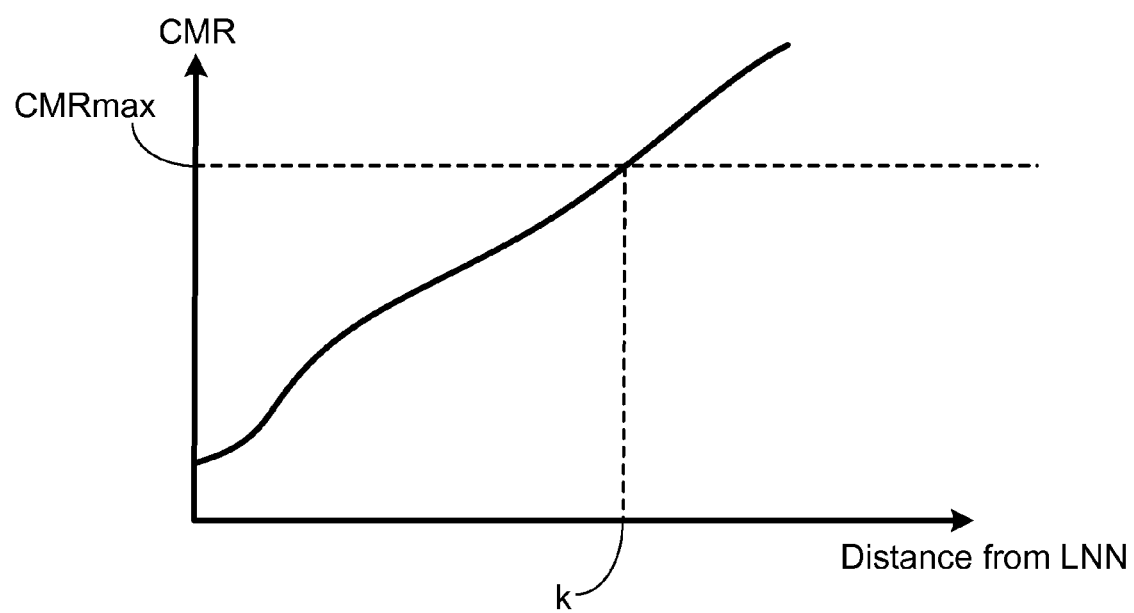
FIG. 16 is a graph schematically showing the results of a handover threshold detection algorithm.

FIG. 16 illustrates an example of the variation of the measured quantity CMRi,j,k with the distance from the LNN. A predetermined threshold is stored in the controller for comparison with the CMR in step S54. When the CMR is found to exceed the threshold $CMR_{max}$ at point k, defined for this specific set of measurements, the controller triggers either the DMTF tone generator or the SMS message generator to indicate to the user in step S56 that a handover is about to take place.

In the embodiment shown in FIG. 13, the trigger causes the introduction of audio tones or DTMF tones into the audio stream either via the codec 78 or via signalling through the 3G processing function 72. The method for introducing these tones into the audio stream is well known to one skilled in the art.

In the embodiment of FIG. 14, the trigger causes the controller 76 to request the transmission of an SMS message from SMS message creation function 79 through the 3G processing function 72 to the UE 60. The SMS message may be a simple text alert, or it may be used to trigger a response in the UE using programmes in the UE based on Java or the USIM (UMTS Subscriber Identity Module) Application Toolkit. The response may for example consist of a plurality of techniques such as the playing of a tune, an audio beep, the flashing of the display lights in the UE.

In step S58, the UE receives the pre-indication of the handover. The UE is configured to provide the operator of the UE with a number of options for managing the possible handover from pico-cell to micro- or macro-cell. Providing this functionality in the UE is possible via program instructions provided by the Java or USIM Application Tool Kit for example. All that is required is that the UE detects the alert indication, and offers perhaps via a menu system response options. Once the user has selected a response in step S60, this is then necessarily transmitted to the LNN processor in step S62 for action.

In step S62, the responses could be relayed to the LNN through the use of a keypad DTMF tone or through the use of soft keys on the UE. The soft-keys on the UE activate a programme in the UE via an appropriate procedure such as Java or USIM Application Tool Kit. The programme may then use direct signalling to the LNN or SMS to notify the LNN of the users intentions.

Preferably, one of three different types of configured responses are provided to the user in step S60, according to settings in the LNN and stored in the controller. In the first scenario for example, the LNN may be configured such that the user only indicates when they wish to leave the pico-cell. Secondly, the LNN may be configured such that the user only indicates when the user wants to remain in the pico-cell, and thirdly the LNN is configured such that the user indicates if they wish to remain in the pico-cell or if they wish to leave the pico-cell.

Thus methods and systems of setting transmitter power levels, particularly in a Local Network Node transmitter, providing a pico cell for private use have been described. A User Equipment (UE) is used to make measurements of the transmission link properties, such as downlink power and round trip time. Based on the measurements made at one or a plurality of locations, the power of the Local Network Node can be determined such that interference is minimised with any overlying cells of a macro-network. Call handovers between the UE and the cell of a macro network can also be arranged based on properties measure by the UE.

The example described above are purely illustrative, and modifications will be apparent to the person skilled in the art, within the scope defined by the claims.

The invention claimed is:

1. A network node for providing user equipment with a connection to a mobile network, the mobile network comprising one or more cells overlapping a coverage area of the network node, the network node comprising:
a processing system to perform operations comprising:
receiving, from the user equipment, one or more parameters related to interference on a downlink between the user equipment and the network node, the interference resulting at least partly from overlapping cells of the mobile network and other competing network nodes, the one or more parameters corresponding to a signal power at the user equipment for one or more of the overlapping cells and the other competing local network nodes; and
determining a transmit power for the downlink based on the one or more parameters.

2. The network node of claim 1, wherein the processing system comprises a measuring processor to determine constants relating a radiation power of a transmitting antenna and a power received from the transmitting antenna.

3. The network node of claim 1, wherein the transmit power is determined based on an expression:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m$$

where $P_{Tx}$ is the transmit power, $E_b$ is a required energy per bit, $N_o$ is a noise power spectral density, PG is a processing gain, $I_{oi}$ is a measured received signal power at the user equipment from an overlapping cell, $I_{oj}$ is a measured received signal power at the user equipment from a competing network node, a and b are scaling factors, m and n are numbers of overlapping cells and competing network nodes respectively, $T_c$ is a chip duration, r is a distance of the user equipment from the network node, k and N are constants relating a path loss in the downlink to the distance, and F is a predetermined margin.

4. The network node of claim 1, wherein the processing system comprises a controller to request the user equipment to obtain information related to a power of the downlink and to obtain the one or more parameters.

5. A method for use in determining a transmit power of a downlink between a network node and user equipment having a connection to a mobile network via the network node, the mobile network comprising one or more cells overlapping a coverage area of the network node, the method being performed by the user equipment and comprising:
obtaining one or more parameters related to interference on a downlink between the user equipment and the network node, the interference resulting at least partly from overlapping cells of the mobile network and other competing network nodes, the one or more parameters corresponding to a signal power at the user equipment for one or more of the overlapping cells and the other competing network nodes; and
transmitting the one or more parameters to the network node;
wherein the one or more parameters are usable by the network node in a process for determining a transmit power for the downlink.

6. The method of claim 5, wherein the process for determining the transmit power for the downlink comprises:
determining, using information related to the power of the downlink, constants relating a radiation power of a transmitting antenna and a power received from the antenna.

7. The method of claim 5, wherein the transmit power for the downlink is based on an expression:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m$$

where $P_{Tx}$ is the transmit power, $E_b$ is a required energy per bit, $N_o$ is a noise power spectral density, PG is a processing gain, $I_{oi}$ is a measured received signal power at the user equipment from an overlapping cell, $I_{oj}$ is a measured received signal power at the user equipment from a competing network node, a and b are scaling factors, m and n are numbers of overlapping cells and competing network nodes respectively, $T_c$ is a chip duration, r is a distance of the user equipment from the network node, k and N are constants relating a path loss in the downlink to the distance, and F is a predetermined margin.

8. The method of claim 5, further comprising:
receiving a message from the network node that instructs the user equipment to measure one or more parameters related to the power of the downlink; and
measuring the one or more parameters related to the interference.

9. A method performed by a network node for providing user equipment with a connection to a mobile network, the mobile network comprising one or more cells overlapping a coverage area of the network node, the method comprising:
receiving, from the user equipment, one or more parameters related to interference on a downlink between the user equipment and the network node, the interference resulting at least partly from overlapping cells of the mobile network and other competing network nodes, the one or more parameters corresponding to a signal power at the user equipment for one or more of the overlapping cells and the other competing local network nodes; and
determining a transmit power for the downlink based on the one or more parameters.

10. The method of claim 9, wherein determining the transmit power comprises determining constants relating a radiation power of a transmitting antenna and a power received from the transmitting antenna.

11. The method node of claim 9, wherein the transmit power is based on an expression:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m$$

where $P_{TX}$ is the transmit power, $E_b$ is a required energy per bit, $N_o$ is a noise power spectral density, PG is a processing gain, $I_{oi}$ is a measured received signal power at the user equipment from an overlapping cell, $I_{oj}$ is a measured received signal power at the user equipment from a competing network node, a and b are scaling factors, m and n are numbers of overlapping cells and competing network nodes respectively, $T_c$ is a chip duration, r is a distance of the user equipment from the network node, k and N are constants relating a path loss in the downlink to the distance, and F is a predetermined margin.

12. The method of claim 9, further comprising requesting that the user equipment measure one or more parameters related to a power of the downlink and the one or more parameters related to the interference.

13. User equipment configured for connection with a mobile network via a network node, the mobile network comprising one or more cells overlapping a coverage area of the network node, the user equipment comprising:
a processing device to perform operations comprising:
obtaining one or more parameters related to interference on a downlink between the user equipment and the network node, the interference resulting at least partly from overlapping cells of the mobile network and other competing network nodes, the one or more parameters corresponding to a signal power at the user equipment for one or more of the overlapping cells and the other competing network nodes; and
transmitting the one or more parameters to the network node;
wherein the one or more parameters are usable by the network node in a process for determining a transmit power for the downlink.

14. The user equipment of claim 13, wherein the process for determining the transmit power for the downlink comprises:
determining, using information related to the power of the downlink, constants relating a radiation power of a transmitting antenna and a power received from the antenna.

15. The user equipment of claim 13, wherein the transmit power for the downlink is based on an expression:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m$$

where $P_{TX}$ is the transmit power, $E_b$ is a required energy per bit, $N_o$ is a noise power spectral density, PG is a processing gain, $I_{oi}$ is a measured received signal power at the user equipment from an overlapping cell, $I_{oj}$ is a measured received signal power at the user equipment from a competing network node, a and b are scaling factors, m and n are numbers of overlapping cells and competing network nodes respectively, $T_c$ is a chip duration, r is a distance of the user equipment from the network node, k and N are constants relating a path loss in the downlink to the distance, and F is a predetermined margin.

16. The user equipment of claim 13, wherein the operations comprise:
receiving a message from the network node that instructs the user equipment to measure one or more parameters related to the power of the downlink; and
measuring the one or more parameters related to the interference.

17. A system for providing user equipment with a connection to a mobile network via a network node, the mobile network comprising one or more cells overlapping a coverage area of the network node, the system comprising:
the user equipment comprising processing circuitry to perform operations comprising:
obtaining one or more parameters related to interference on a downlink between the user equipment and the network node, the interference resulting at least partly from overlapping cells of the mobile network and other competing network nodes, the one or more parameters corresponding to a signal power at the user equipment for one or more of the overlapping cells and the other competing network nodes; and
transmitting the one or more parameters to the network node; and
the network node comprising processing circuitry to perform operations comprising:

receiving the one or more parameters from the user equipment; and determining a transmit power for the downlink using the one or more parameters.

18. The system of claim 17, wherein the processing circuitry of the network node is configured to perform operations comprising:

receiving one or more parameters related to the transmit power of the downlink between the user equipment and the local network node;

wherein determining the transmit power for the downlink is performed also using the one or more parameters related to the power of the downlink.

19. The system of claim 17, wherein the processing circuitry of the network node comprises one or more processors.

20. The system of claim 19, wherein the one or more processors comprise a first processor and a second processor.

21. The system of claim 17, wherein the transmit power for the downlink is based on an expression:

$$P_{Tx} = \frac{E_b}{N_o} \frac{1}{PG} \frac{\left[\sum_{i=1}^{m} a_i I_{oi} + \sum_{j=1}^{n} b_j I_{oj}\right]}{T_c} \frac{k_{LNN}}{r^{N_{LNN}}} F_m$$

where $P_{TX}$ is the transmit power, $E_b$ is a required energy per bit, $N_o$ is a noise power spectral density, PG is a processing gain, $I_{oi}$ is a measured received signal power at the user equipment from an overlapping cell, $I_{oj}$ is a measured received signal power at the user equipment from a competing network node, a and b are scaling factors, m and n are numbers of overlapping cells and competing network nodes respectively, $T_c$ is a chip duration, r is a distance of the user equipment from the network node, k and N are constants relating a path loss in the downlink to the distance, and F is a predetermined margin.

* * * * *

UNITED STATES PATENT AND TRADEMARK OFFICE
CERTIFICATE OF CORRECTION

| | |
|---|---|
| PATENT NO. | : 8,886,249 B2 |
| APPLICATION NO. | : 13/673648 |
| DATED | : November 11, 2014 |
| INVENTOR(S) | : Richardson |

It is certified that error appears in the above-identified patent and that said Letters Patent is hereby corrected as shown below:

In the Claims

Column 19, Line 9, Claim 7, delete "$1_{oi}$" and insert -- $I_{oi}$ --, therefor.

Column 19, Line 19, Claim 8, delete "comprising;" and insert -- comprising: --, therefor.

Column 19, Line 44, Claim 11, delete "The method node of claim" and insert -- The method of claim --, therefor.

Column 20, Line 35, Claim 15, delete "$1_{oi}$" and insert -- $I_{oi}$ --, therefor.

Column 22, Line 9, Claim 21, "$1_{oi}$" and insert -- $I_{oi}$ --, therefor.

Signed and Sealed this
Second Day of June, 2015

Michelle K. Lee
*Director of the United States Patent and Trademark Office*